(12) United States Patent
Li et al.

(10) Patent No.: US 12,399,260 B2
(45) Date of Patent: Aug. 26, 2025

(54) RANGING METHOD, RADAR, AND VEHICLE-MOUNTED RADAR

(71) Applicant: SHENZHEN YINWANG INTELLIGENT TECHNOLOGIES CO., LTD., Shenzhen (CN)

(72) Inventors: Honglei Li, Beijing (CN); Qiang Li, Beijing (CN); Tong Jiang, Beijing (CX); Hongying Wu, Beijing (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 994 days.

(21) Appl. No.: 17/489,069

(22) Filed: Sep. 29, 2021

(65) Prior Publication Data
US 2022/0018943 A1    Jan. 20, 2022

Related U.S. Application Data

(63) Continuation of application No. PCT/CN2019/081519, filed on Apr. 4, 2019.

(51) Int. Cl.
  *G01S 7/00*  (2006.01)
  *G01S 7/4863*  (2020.01)
  *G01S 17/10*  (2020.01)
(52) U.S. Cl.
  CPC ............ *G01S 7/4863* (2013.01); *G01S 17/10* (2013.01)
(58) Field of Classification Search
  USPC ................................................ 356/4.01, 5.01
  See application file for complete search history.

(56) References Cited

U.S. PATENT DOCUMENTS

| 7,248,343 | B2 * | 7/2007 | Cardero | G01C 7/02 356/5.1 |
| 7,917,320 | B2 | 3/2011 | Levesque et al. | |
| 9,599,713 | B2 * | 3/2017 | Giger | G01S 7/483 |
| 10,116,925 | B1 * | 10/2018 | Wang | H04N 25/772 |

(Continued)

FOREIGN PATENT DOCUMENTS

| CN | 1487308 A | 4/2004 |
| CN | 103616696 A | 3/2014 |

(Continued)

OTHER PUBLICATIONS

Search Opinion for European Application EP 19922323 (Year: 2023).*

(Continued)

*Primary Examiner* — James R Hulka
(74) *Attorney, Agent, or Firm* — Conley Rose, P.C.

(57) ABSTRACT

A ranging method includes determining a pixel matrix based on a received echo signal, determining a first amplitude value set based on a first pixel, determining a second pixel based on the first pixel, determining, based on the second pixel, a second amplitude value set based on the second pixel, performing a summation on a target first amplitude value set and a target second amplitude value set, obtaining a target ranging set based on all first amplitude value sets and all second amplitude value sets, and performing a ranging based on the target ranging set to improve a signal-to-noise ratio of an accumulated amplitude value set and a ranging accuracy.

20 Claims, 11 Drawing Sheets

(56) References Cited

U.S. PATENT DOCUMENTS

| | | | |
|---|---|---|---|
| 10,232,237 B2* | 3/2019 | Terre | G01S 7/51 |
| 10,801,886 B2* | 10/2020 | Mandai | G01J 1/44 |
| 10,962,628 B1* | 3/2021 | Laifenfeld | G01S 7/487 |
| 2004/0135992 A1* | 7/2004 | Munro | G01S 7/483 356/4.01 |
| 2007/0097352 A1 | 5/2007 | Cardero et al. | |
| 2010/0042362 A1* | 2/2010 | Levesque | G01S 7/487 702/159 |
| 2014/0307248 A1 | 10/2014 | Giger et al. | |
| 2016/0074724 A1 | 3/2016 | Terre | |
| 2018/0209846 A1* | 7/2018 | Mandai | G01S 17/08 |
| 2018/0275259 A1 | 9/2018 | Andreas et al. | |
| 2018/0338127 A1 | 11/2018 | Wang et al. | |
| 2025/0035760 A1* | 1/2025 | Mandai | G01S 17/34 |

FOREIGN PATENT DOCUMENTS

| | | |
|---|---|---|
| CN | 104024878 A | 9/2014 |
| CN | 105607073 A | 5/2016 |
| CN | 105891841 A | 8/2016 |
| CN | 109283541 A | 1/2019 |
| WO | 2005008271 A2 | 1/2005 |

OTHER PUBLICATIONS

Niclass, C., et al., "A 0.18µm CMOS SoC for a 100m-range 10fps 200×96-pixel time-of-flight depth sensor," IEEE Journal of Soud-State Circuits, vol. 49, No. 1, Jan. 2014, 16 pages.

Yoshioka, K., et al., "A 20-ch TDC/ADC Hybrid Architecture LiDAR SoC for 240 × 96 Pixel 200-m Range Imaging With Smart Accumulation Technique and Residue Quantizing SAR ADC," IEEE. Journal of Solid-State Circuits. vol. 51, No. 11, Nov. 2018, 14 pages.

Jinliang, Y., et al., "Image Registration and Superposition for Improving Ranging Accuracy of Imaging Laser Radar," Chinese Journal of Lasers, vol. 37, No. 6, Jun. 2010, with an English abstract, 5 pages.

Yoshioka, K., et al,m "A 20ch TDC/ADC Hybrid SoC for 240 96-Pixel 10%-Reflection 0.125%-Precision 200m-Range Imaging LiDAR with Smart Accumulation Technique", ISSCC 2018 / SESSION 5 / Image Sensors / 5.7, IEEE International Solid-State Circuits Conference, 2018, 3 pages.

* cited by examiner

RANGING METHOD, RADAR, AND VEHICLE-MOUNTED RADAR

CROSS-REFERENCE TO RELATED APPLICATIONS

This application is a continuation of International Patent Application No. PCT/CN2019/081519 filed on Apr. 4, 2019, the disclosure of which is hereby incorporated by reference in its entirety.

TECHNICAL FIELD

This application relates to the field of radar technologies, and in particular, to a ranging method, radar, and vehicle-mounted radar.

BACKGROUND

Light detection and ranging (LiDAR) is an optical remote sensing technology that uses an electromagnetic wave from an ultraviolet band to a far infrared band to detect a scattering light characteristic of a target to obtain information about the target object. The LiDAR has high measurement accuracy and fine temporal and spatial resolution, can complete functions such as ranging, target detection, tracking, and imaging recognition, and may be applied to fields such as intelligent transportation, self-driving, atmospheric environment monitoring, geographical mapping, and an unmanned aerial vehicle. The ranging is a basic function of the light detection and ranging. Most types of light detection and ranging measure time t during which light transmits from the light detection and ranging to a target object and then returns to the light detection and ranging, and measure a distance from the light detection and ranging to the target object by using the light transmission time t.

The light detection and ranging may perform sampling on a received echo signal by using an analog-to-digital converter (ADC), to obtain a sampled digital echo signal. The sampled digital echo signal is used for ranging after digital signal processing. In a case of a long distance or a low reflectivity, energy of a signal severely attenuates, the signal is submerged in noise such as background light noise, shot noise, or thermal noise, and a signal-to-noise ratio is low. Therefore, how to improve a signal-to-noise ratio of an echo signal is a key technology in the light detection and ranging.

In other approaches, a signal-to-noise ratio of an echo signal is improved by using an accumulating and averaging algorithm. This requires that a transmit end of light detection and ranging should send a plurality of detection signals in a same direction, and a receive end of the light detection and ranging should accumulate and average a plurality of received echo signals. In this way, pulse parts of different echo signals are significantly enhanced after being mutually accumulated, and noise parts of different echo signals are random signals and therefore are not significantly enhanced after being accumulated, thereby improving a signal-to-noise ratio. However, in this technology, the light detection and ranging needs to send a plurality of detection signals, and consequently measurement time of each sampling point is prolonged, causing a reduction in a measurement speed or a frame rate.

SUMMARY

This application provides a ranging method, radar, and vehicle-mounted radar, to improve ranging accuracy of radar.

A first aspect of embodiments of this application provides a ranging method. The method includes radio detection and ranging (radar) determines a first amplitude value set based on a first echo signal corresponding to a first pixel, where the first amplitude value set includes amplitude values corresponding to a plurality of first sampling points of the first echo signal, the radar determines a plurality of second amplitude value sets based on the first amplitude value set and a plurality of second pixels in an associated area of the first pixel, where at least one of the plurality of second pixels is adjacent to the first pixel, the plurality of second pixels are in a one-to-one correspondence with a plurality of second echo signals, the plurality of second amplitude value sets includes amplitude values corresponding to a plurality of second sampling points of one of the plurality of second echo signals, and locations of the plurality of second sampling points in the second echo signal are the same as locations of the plurality of first sampling points in the first echo signal, the radar performs summation on amplitude values corresponding to all sampling points at same locations in the first amplitude value set and each second amplitude value set, to obtain an accumulated amplitude value set, and the radar performs ranging on the target object based on the accumulated amplitude value set.

Because the first pixel is located in the same associated area as the second pixel, it indicates that a location of the first pixel is adjacent to a location of the second pixel, a transmit angle corresponding to the first pixel is adjacent to a transmit angle corresponding to the second pixel, and the first echo signal corresponding to the first pixel and the second echo signal corresponding to the second pixel are echo signals reflected by a same target object, so that there is a strong correlation between pulse signals corresponding to the plurality of first sampling points and the plurality of second sampling points at the same locations in the first echo signal and the second echo signal, but there are weak correlations between the pulse signal and noise and between noise. Summation is performed on the amplitude values corresponding to all the sampling points at the same locations in the first amplitude value set and each second amplitude value set, to obtain the accumulated amplitude value set, thereby effectively improving a signal-to-noise ratio of the accumulated amplitude value set and improving ranging accuracy.

Based on the first aspect of the embodiments of this application, in an optional implementation of the first aspect of the embodiments of this application, In a process in which the radar determines the first amplitude value set based on the first echo signal corresponding to the first pixel, the radar needs to execute the following steps. The radar determines, based on the first echo signal, a digital echo sequence corresponding to the first pixel, where the digital echo sequence includes amplitude values corresponding to all sampling points of the first echo signal, and the radar determines at least one first amplitude value set from the digital echo sequence, where the first amplitude value set includes at least one amplitude value of a target list, the target list includes an amplitude value corresponding to each of N inflection points in the digital echo sequence, N is a positive integer greater than or equal to 1, and the amplitude value corresponding to each inflection point is greater than an amplitude value corresponding to a sampling point adjacent to the inflection point. If one first amplitude value set is determined from the digital echo sequence, the first amplitude value set includes the amplitude values that correspond to all the sampling points and that are included in the digital echo sequence, or if a plurality of first amplitude value sets are determined from the digital echo sequence, the first amplitude value set may include some amplitude values that correspond to some sampling points and that are sequentially sorted from front to back based on sampling moments in the digital echo sequence.

The first amplitude value set includes an amplitude value corresponding to at least one of the N inflection points in the digital echo sequence. Ranging is performed by using the first amplitude value set that includes the amplitude value corresponding to the inflection point, so that a pulse signal and noise can be effectively distinguished, and ranging efficiency can be improved by using the first amplitude value set that has a relatively high signal-to-noise ratio.

Based on the first aspect of the embodiments of this application, in an optional implementation of the first aspect of the embodiments of this application, in the process of determining the first amplitude value set based on the first echo signal corresponding to the first pixel, the radar further executes the following step. The radar determines that an amplitude value at a middle location in the plurality of amplitude values included in the first amplitude value set is one of N amplitude values included in the target list, where all the amplitude values included in the first amplitude value set are sequentially arranged in time order based on corresponding sampling moments, and a sampling moment corresponding to the amplitude value at the middle location is a middle moment in all the sampling moments corresponding to the first amplitude value set.

Because the amplitude value at the middle location in the plurality of amplitude values included in the first amplitude value set is the amplitude value corresponding to the inflection point, it is effectively ensured that a probability that a pulse signal that is reflected by the target object and that can be used for accurate ranging appears in the first amplitude value set greatly increases, and accuracy of performing ranging by using the first amplitude value set is effectively ensured.

Based on the first aspect of the embodiments of this application, in an optional implementation of the first aspect of the embodiments of this application, before executing the step of performing summation on amplitude values corresponding to all sampling points at same locations in the first amplitude value set and each second amplitude value set, to obtain an accumulated amplitude value set, the radar further needs to execute the following steps. The radar determines a correlation coefficient of the first amplitude value set and each second amplitude value set, where a value of the correlation coefficient is in a positive correlation with a similarity degree of the first amplitude value set and each second amplitude value set, and the radar determines that the correlation coefficient is greater than or equal to a preset threshold.

The value of the correlation coefficient determined by the radar is in the positive correlation with the similarity degree of the first amplitude value set and the second amplitude value set that correspond to each other, in other words, the correlation coefficient can represent the similarity degree of the first amplitude value set and the second amplitude value set. If the radar performs ranging by using a first amplitude value set and a second amplitude value set with a larger correlation coefficient, a signal-to-noise ratio of the first amplitude value set and a signal-to-noise ratio of the second amplitude value set can be improved to a greater degree, thereby effectively improving ranging accuracy.

Based on the first aspect of the embodiments of this application, in an optional implementation of the first aspect of the embodiments of this application, the preset threshold is in a positive correlation with at least one of a signal-to-noise ratio of the first amplitude value set, a signal-to-noise ratio of the first echo signal, or a sampling moment of a peak sampling point included in the first amplitude value set, where the peak sampling point is a sampling point corresponding to a largest value of the plurality of amplitude values included in the first amplitude value set.

When the correlation coefficient in this aspect is correlated with the foregoing parameter, the signal-to-noise ratio of the first amplitude value set can be effectively improved. When the radar determines the second amplitude value set based on the first amplitude value set with an improved signal-to-noise ratio, the radar performs measurement based on the first amplitude value set and the second amplitude value set, thereby fully considering impact of a spatial correlation on ranging. The spatial correlation means that the target object has a specific volume, and different location areas of the target object may be mapped to a plurality of neighboring pixels of the light detection and ranging, and there is a specific correlation between pulses in the pixels in terms of distance, amplitude, shape, or the like. Therefore, a signal-to-noise ratio of an echo signal can be improved by determining a spatial correlation between echo signals of neighboring pixels.

Based on the first aspect of the embodiments of this application, in an optional implementation of the first aspect of the embodiments of this application, the radar determines the correlation coefficient based on a covariance of the first amplitude value set and the second amplitude value set, a variance of the first amplitude value set, and a variance of the second amplitude value set.

The radar may calculate the correlation coefficient according to the following formula:

$$r(W'_{x,y-1,i}, W_{x,y,i}) = \frac{\text{Cov}(W'_{x,y-1,i}, W_{x,y,i})}{\sqrt{\text{Var}(W'_{x,y-1,i})\text{Var}(W_{x,y,i})}} =$$

$$\frac{\sum_{n=1}^{N_{Truncate}} (w_{x,y,i}(n) - \overline{W_{x,y,i}})(w'_{x,y-1,i}(n) - \overline{W'_{x,y-1,i}})}{\sqrt{\sum_{n=1}^{N_{Truncate}} (w_{x,y,i}(n) - \overline{W_{x,y,i}})^2} \sqrt{\sum_{n=1}^{N_{Truncate}} (w'_{x,y,i}(n) - \overline{W'_{x,y-1,i}})^2}},$$

where $\text{Cov}(W_{x,y-1,i}', W_{x,y,i})$ is the covariance of the second amplitude value set $w_{x,y-1,i}'(n)$ and the first amplitude value set $w_{x,y,i}(n)$ that correspond to each other, $\text{Var}(W_{x,y-1,i}')$ is the variance of $w_{x,y-1,i}'(n)$, $\text{Var}(W_{x,y,i})$ is the variance of $w_{x,y,i}(n)$, $N_{Truncate}$ is a quantity of sampling points included in the first amplitude value set, $\overline{W_{x,y,i}}$ represents an average value of $w_{x,y,i}(n)$ and $\overline{W_{x,y-1,i}'}$ represents an average value of $w_{x,y-1,i}'(n)$.

The value of the correlation coefficient determined by the radar is in an accurate positive correlation with the similarity degree of the first amplitude value set and the second amplitude value set. The radar performs ranging by using the first amplitude value set and the second amplitude value set with the correlation coefficient greater than the preset threshold, thereby effectively improving ranging accuracy.

Based on the first aspect of the embodiments of this application, in an optional implementation of the first aspect of the embodiments of this application, before the radar performs summation on the amplitude values corresponding to all the sampling points at the same locations in the first amplitude value set and each second amplitude value set, to obtain the accumulated amplitude value set, the method further includes the following steps. The radar performs summation on a target parameter of the first pixel and target parameters of the plurality of second pixels to obtain a target sum, where the target parameter of the first pixel is an amplitude value of a peak sampling point of the first echo signal corresponding to the first pixel or the signal-to-noise ratio of the first echo signal corresponding to the first pixel, and the target parameter of the second pixel is an amplitude value of a peak sampling point of a second echo signal corresponding to the second pixel or a signal-to-noise ratio of a second echo signal corresponding to the second pixel, and when the radar determines that a ratio of the target sum to a weighting coefficient is greater than or equal to the target parameter of the first pixel, the radar executes the following step.

The radar performs summation on the first amplitude value set and the second amplitude value set only when the radar determines that the ratio of the target sum to the weighting coefficient is greater than or equal to the target parameter of the first pixel, to effectively improve ranging accuracy.

Based on the first aspect of the embodiments of this application, in an optional implementation of the first aspect of the embodiments of this application, before the radar performs summation on the amplitude values corresponding to all the sampling points at the same locations in the first amplitude value set and each second amplitude value set, to obtain the accumulated amplitude value set, the method further includes the following step. The radar determines that the target parameter of the second pixel is greater than or equal to a product of the target parameter of the first pixel and a preset coefficient, where the target parameter of the first pixel is the amplitude value of the peak sampling point of the first echo signal corresponding to the first pixel or the signal-to-noise ratio of the first echo signal corresponding to the first pixel, and the target parameter of the second pixel is the amplitude value of the peak sampling point of the second echo signal corresponding to the second pixel or the signal-to-noise ratio of the second echo signal corresponding to the second pixel.

The radar performs summation on the first amplitude value set and the second amplitude value set only when the radar determines that the target parameter of the second pixel is greater than or equal to the product of the target parameter of the first pixel and the preset coefficient, to effectively improve ranging accuracy.

Based on the first aspect of the embodiments of this application, in an optional implementation of the first aspect of the embodiments of this application, because ranging accuracy can be improved by performing, by the radar, ranging on different echo signals reflected by a same target object, and neighboring pixels have neighboring transmit angles in a pixel matrix, it indicates that the first pixel and the second pixel that are adjacent to each other in the pixel matrix correspond to a same target object, that is, the first echo signal corresponding to the first pixel and the second echo signal corresponding to the second pixel are reflected by the same target object.

That the first pixel is adjacent to the second pixel in this aspect means that the first pixel is located in the same associated area as the second pixel in the pixel matrix, the pixel matrix includes a plurality of pixels distributed in M rows and N columns, different pixels in the plurality of pixels correspond to different echo signals, M and N are positive integers greater than or equal to 1, the first pixel is a pixel included in the pixel matrix, and the associated area is a partial area included in the pixel matrix.

Because the first pixel is adjacent to the second pixel in the pixel matrix, the radar performs summation only on the first amplitude value set corresponding to the first pixel and the second amplitude value set corresponding to the second pixel, to effectively improve the signal-to-noise ratio of the first echo signal and improve ranging accuracy.

Based on the first aspect of the embodiments of this application, in an optional implementation of the first aspect of the embodiments of this application, a process in which the radar performs ranging on the target object based on the accumulated amplitude value set further includes the following steps. The radar obtains a target ranging set, where the target ranging set is a sum of all accumulated amplitude value sets corresponding to a plurality of first amplitude value sets, and the radar performs ranging based on the target ranging set.

According to the ranging method in this aspect, when the radar determines the plurality of first amplitude value sets, the radar performs ranging by using the obtained target ranging set, to effectively improve the signal-to-noise ratio of the first echo signal, and then effectively improve ranging accuracy.

Based on the first aspect of the embodiments of this application, in an optional implementation of the first aspect of the embodiments of this application, a process in which the radar performs ranging on the target object based on the accumulated amplitude value set further includes the following steps. The radar obtains a target ranging set, where the target ranging set is a sum of all accumulated amplitude value sets corresponding to a plurality of first amplitude value sets, and the radar performs ranging based on an average sequence, where the average sequence is a sequence obtained by averaging the target ranging set. The radar performs ranging based on the average sequence, to effectively improve the signal-to-noise ratio of the first echo signal, and then effectively improve ranging accuracy.

Based on the first aspect of the embodiments of this application, in an optional implementation of the first aspect of the embodiments of this application, before the radar determines the plurality of second amplitude value sets based on the first amplitude value set and the plurality of second pixels in the associated area of the first pixel, the method further includes the following step. The radar determines that the signal-to-noise ratio of the first echo signal is less than or equal to a signal-to-noise ratio threshold.

The radar first determines whether the signal-to-noise ratio of the first echo signal is less than or equal to the signal-to-noise ratio threshold. When the signal-to-noise ratio of the first echo signal is greater than the signal-to-noise ratio threshold, the radar may directly perform ranging based on the first echo signal to obtain an accurate ranging result. When the signal-to-noise ratio of the first echo signal is less than or equal to the signal-to-noise ratio threshold, the radar may perform ranging by determining the first amplitude value set and the second amplitude value set, to improve the signal-to-noise ratio of the signal and improve ranging accuracy.

A second aspect of the embodiments of this application provides radar, including a first determining unit configured to determine a first amplitude value set based on a first echo signal corresponding to a first pixel, where the first amplitude value set includes amplitude values corresponding to a plurality of first sampling points of the first echo signal, a second determining unit configured to determine a plurality of second amplitude value sets based on the first amplitude value set and a plurality of second pixels in an associated area of the first pixel, where at least one of the plurality of second pixels is adjacent to the first pixel, the plurality of second pixels are in a one-to-one correspondence with a plurality of second echo signals, the plurality of second amplitude value sets includes amplitude values corresponding to a plurality of second sampling points of one of the plurality of second echo signals, and locations of the plurality of second sampling points in the second echo signal are the same as locations of the plurality of first sampling points in the first echo signal, a summation unit configured to perform summation on amplitude values corresponding to all sampling points at same locations in the first amplitude value set and each second amplitude value set, to obtain an accumulated amplitude value set, and a ranging unit configured to perform ranging on the target object based on the accumulated amplitude value set.

For detailed descriptions of a specific execution process and beneficial effects of executing an echo signal processing method by the radar provided in this aspect, refer to the first aspect of the embodiments of this application. Details are not described in this aspect again.

Based on the second aspect of the embodiments of this application, in an optional implementation of the second aspect of the embodiments of this application, the first determining unit includes a first determining module configured to determine, based on the first echo signal, a digital echo sequence corresponding to the first pixel, where the digital echo sequence includes amplitude values corresponding to all sampling points of the first echo signal, and a second determining module configured to determine at least one first amplitude value set from the digital echo sequence, where the first amplitude value set includes at least one amplitude value of a target list, the target list includes an amplitude value corresponding to each of N inflection points in the digital echo sequence, N is a positive integer greater than or equal to 1, and the amplitude value corresponding to each inflection point is greater than an amplitude value corresponding to a sampling point adjacent to the inflection point.

Based on the second aspect of the embodiments of this application, in an optional implementation of the second aspect of the embodiments of this application, the second determining module is further configured to determine that an amplitude value at a middle location in the plurality of amplitude values included in the first amplitude value set is one of N amplitude values included in the target list, where all the amplitude values included in the first amplitude value set are sequentially arranged in time order based on corresponding sampling moments, and a sampling moment corresponding to the amplitude value at the middle location is a middle moment in all the sampling moments corresponding to the first amplitude value set.

Based on the second aspect of the embodiments of this application, in an optional implementation of the second aspect of the embodiments of this application, the radar further includes a first summation trigger unit configured to determine a correlation coefficient of the first amplitude value set and each second amplitude value set, where a value of the correlation coefficient is in a positive correlation with a similarity degree of the first amplitude value set and each second amplitude value set, and the first summation trigger unit is further configured to determine that the correlation coefficient is greater than or equal to a preset threshold.

Based on the second aspect of the embodiments of this application, in an optional implementation of the second aspect of the embodiments of this application, the preset threshold is in a positive correlation with at least one of a signal-to-noise ratio of the first amplitude value set, a signal-to-noise ratio of the first echo signal, or a sampling moment of a peak sampling point included in the first amplitude value set, where the peak sampling point is a sampling point corresponding to a largest value of the plurality of amplitude values included in the first amplitude value set.

Based on the second aspect of the embodiments of this application, in an optional implementation of the second aspect of the embodiments of this application, the first summation trigger unit is further configured to determine the correlation coefficient based on a covariance of the first amplitude value set and the second amplitude value set, a variance of the first amplitude value set, and a variance of the second amplitude value set.

Based on the second aspect of the embodiments of this application, in an optional implementation of the second aspect of the embodiments of this application, the radar further includes a second summation trigger unit configured to perform summation on a target parameter of the first pixel and target parameters of the plurality of second pixels to obtain a target sum, where the target parameter of the first pixel is an amplitude value of a peak sampling point of the first echo signal corresponding to the first pixel or the signal-to-noise ratio of the first echo signal corresponding to the first pixel, and the target parameter of the second pixel is an amplitude value of a peak sampling point of a second echo signal corresponding to the second pixel or a signal-to-noise ratio of a second echo signal corresponding to the second pixel, and the second summation trigger unit is further configured to determine that a ratio of the target sum to a weighting coefficient is greater than or equal to the target parameter of the first pixel.

Based on the second aspect of the embodiments of this application, in an optional implementation of the second aspect of the embodiments of this application, the radar further includes a third summation trigger unit configured to determine that the target parameter of the second pixel is greater than or equal to a product of the target parameter of the first pixel and a preset coefficient, where the target parameter of the first pixel is the amplitude value of the peak sampling point of the first echo signal corresponding to the first pixel or the signal-to-noise ratio of the first echo signal corresponding to the first pixel, and the target parameter of the second pixel is the amplitude value of the peak sampling point of the second echo signal corresponding to the second pixel or the signal-to-noise ratio of the second echo signal corresponding to the second pixel.

Based on the second aspect of the embodiments of this application, in an optional implementation of the second aspect of the embodiments of this application, the associated area is a partial area included in a pixel matrix, the pixel matrix includes a plurality of pixels distributed in M rows and N columns, different pixels in the plurality of pixels correspond to different echo signals, M and N are positive integers greater than or equal to 1, and the first pixel is a pixel included in the pixel matrix.

Based on the second aspect of the embodiments of this application, in an optional implementation of the second aspect of the embodiments of this application, the ranging unit includes a first ranging module configured to obtain a target ranging set, where the target ranging set is a sum of all accumulated amplitude value sets corresponding to a plurality of first amplitude value sets, and a second ranging module configured to perform ranging based on the target ranging set.

Based on the second aspect of the embodiments of this application, in an optional implementation of the second aspect of the embodiments of this application, the ranging unit includes a third ranging module configured to obtain a target ranging set, where the target ranging set is a sum of all accumulated amplitude value sets corresponding to a plurality of first amplitude value sets, and a fourth ranging module configured to perform ranging based on an average sequence, where the average sequence is a sequence obtained by averaging the target ranging set.

Based on the second aspect of the embodiments of this application, in an optional implementation of the second aspect of the embodiments of this application, the radar further includes a trigger unit configured to determine that the signal-to-noise ratio of the first echo signal is less than or equal to a signal-to-noise ratio threshold, and the first determining unit is further configured to, when the signal-to-noise ratio of the first echo signal is less than or equal to the signal-to-noise ratio threshold, determine the first amplitude value set based on the first pixel corresponding to the received first echo signal.

A third aspect of the embodiments of this application provides vehicle-mounted radar, including a laser, a detector, and a signal processing and control unit. The laser is configured to transmit a plurality of detection signals to a target object, the detector is configured to receive optical signals generated by the target object by reflecting the plurality of detection signals, the signal processing and control unit is configured to perform processing based on the optical signals to generate a first echo signal and a plurality of second echo signals, and the signal processing and control unit is further configured to execute the method according to any one of the third aspect of the embodiments of this application.

A fourth aspect of the embodiments of this application provides radar. The radar includes a processor and a memory, the memory is configured to store a program that supports the radar in executing the method according to any one of the first aspect of the embodiments of this application, and the processor is configured to execute the program stored in the memory.

A fifth aspect of the embodiments of this application provides a computer program product. When being executed, the computer product is configured to execute the method according to any one of the first aspect of the embodiments of this application.

A sixth aspect of the embodiments of this application provides a computer-readable storage medium. The computer-readable storage medium stores an instruction, and the instruction is used to execute the method according to any one of the first aspect of the embodiments of this application.

DESCRIPTION OF EMBODIMENTS

The following clearly describes the technical solutions in embodiments of this application with reference to the accompanying drawings in the embodiments of this application. Clearly, the described embodiments are merely some but not all of the embodiments of this application. All other embodiments obtained by a person skilled in the art based on the embodiments of this application without creative efforts shall fall within the protection scope of this application.

The term "and/or" in this application may indicate an association relationship for describing associated objects and represent that three relationships may exist. For example, A and/or B may represent the following three cases: only A exists, both A and B exist, and only B exists. In addition, the character "/" in this application generally indicates an "or" relationship between the associated objects.

In the specification, claims, and accompanying drawings of this application, the terms "first", "second", and the like are intended to distinguish between similar objects but are not necessarily intended to indicate a specific order or sequence. It should be understood that the data termed in such a way is interchangeable in proper circumstances so that the embodiments described herein can be implemented in an order other than the order illustrated or described herein. Moreover, the terms "include", "have", and any other variants thereof are intended to cover the non-exclusive inclusion, for example, a process, method, system, product, or device that includes a list of steps or modules is not necessarily limited to those steps or modules expressly listed, but may include other steps or modules not expressly listed or inherent to such a process, method, system, product, or device.

Figure 1A:
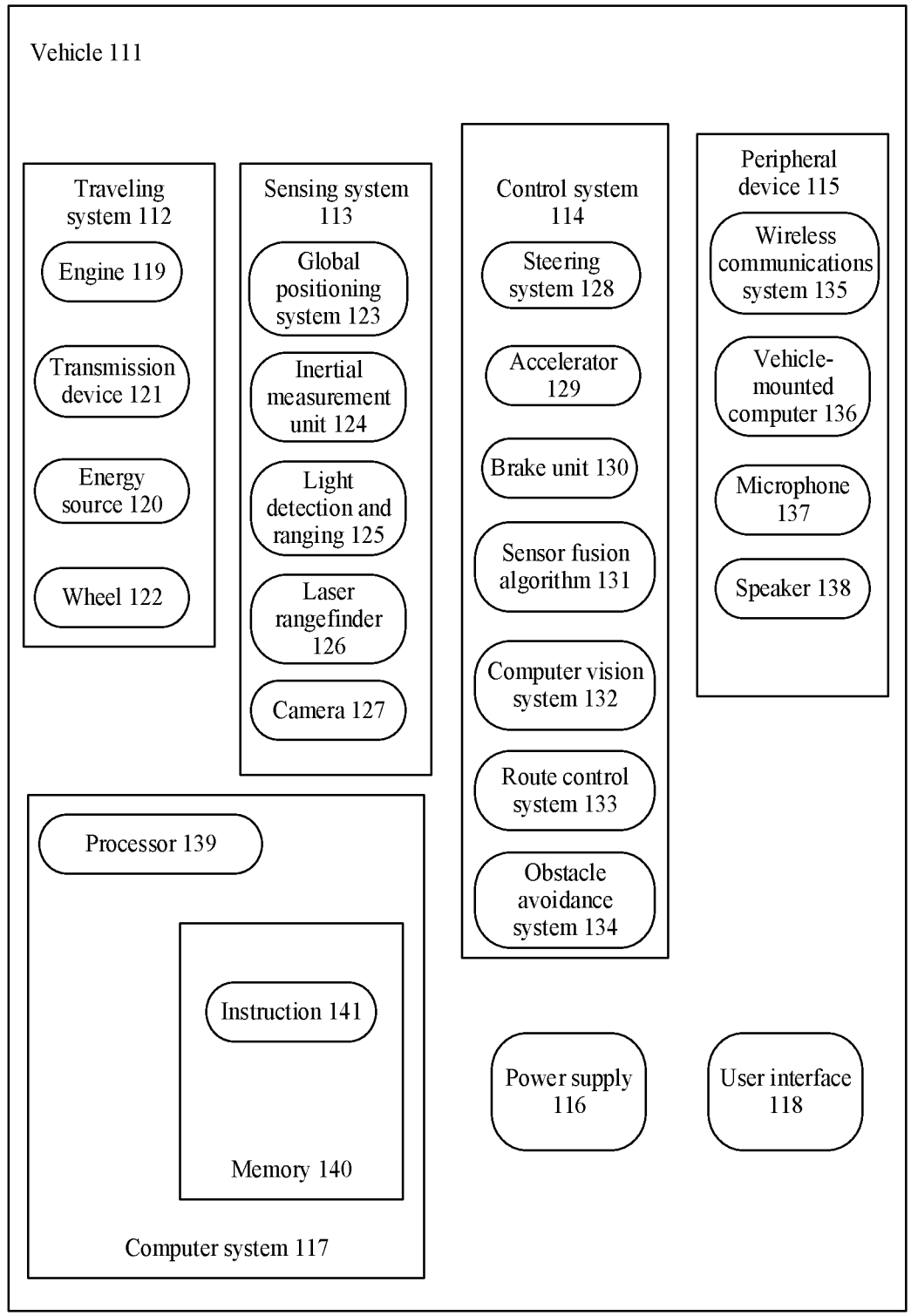
FIG. 1A is a schematic structural diagram of a vehicle according to this application.

To better understand a ranging method provided in the embodiments of this application for ranging, the following first provides, with reference to FIG. 1A, an example description of a possible application scenario of the ranging method provided in the embodiments of this application. It should be noted that the description of the application scenario of the method in the embodiments of this application is an optional example and is not limited.

FIG. 1A is a functional block diagram of a vehicle according to an embodiment of this application. The vehicle is configured to implement the ranging method in this application. In an embodiment, a vehicle 111 is configured to be in a completely or partially self-driving mode. For example, the vehicle 111 may control the vehicle 111 while being in a self-driving mode, and may determine, through manual operation, current statuses of the vehicle and an ambient environment of the vehicle, possible behavior of at least one other vehicle in the ambient environment, and a confidence level corresponding to a possibility that the other vehicle executes the possible behavior, and control the vehicle 111 based on the determined information. When the vehicle 111 is in the self-driving mode, the vehicle 111 may be configured to operate without interaction with a person.

The vehicle 111 may include various subsystems, such as a traveling system 112, a sensor system 113, a control system 114, one or more peripheral devices 115, and a power supply 116, a computer system 117, and a user interface 118. Optionally, the vehicle 111 may include more or fewer subsystems, and each subsystem may include a plurality of elements. In addition, all subsystems and elements of the vehicle 111 may be interconnected in a wired or wireless manner.

The traveling system 112 may include components that provide power movement for the vehicle 111. In an embodiment, the traveling system 112 may include an engine 119, an energy source 120, a transmission device 121, and wheels/tires 122. The engine 119 may be an internal combustion engine, a motor, an air compression engine, or another type of engine combination, for example, a hybrid engine including a gasoline engine and a motor, or a hybrid engine including an internal combustion engine and an air compression engine. The engine 119 converts the energy source 120 into mechanical energy.

Examples of the energy source 120 include gasoline, diesel, other petroleum-based fuel, propane, other compressed-gas-based fuel, ethanol, a photovoltaic module, a battery, and other power sources. The energy source 120 may also provide energy for other systems of the vehicle 111.

The transmission device 121 may transmit mechanical power from the engine 119 to the wheel 122. The transmission device 121 may include a gearbox, a differential, and a drive shaft. In an embodiment, the transmission device 121 may further include another component, such as a clutch system. The drive shaft may include one or more shafts that can be coupled to one or more wheels 122.

The sensor system 113 may include several sensors for sensing information about the ambient environment of the vehicle 111. For example, the sensor system 113 may include a positioning system 123 (the positioning system may be a Global Positioning System (GPS), or may be a BEIDOU navigation satellite system or another positioning system), an inertial measurement unit (IMU) 124, light detection and ranging 125, a laser rangefinder 126, and a camera 127. This application provides an example description by using the light detection and ranging as an example. It should be noted that a specific type of radar is not limited in this application, provided that the radar provided in this application can implement the ranging method in this application. The sensor system 113 may further include sensors (for example, an in-vehicle air quality monitor, fuel gauge, and oil temperature gauge) of an internal system of the monitored vehicle 111. Sensor data from one or more of these sensors can be used to detect targets and corresponding characteristics (such as locations, shapes, directions, or speeds) of the targets. This detection and recognition is a key function of safe operation of the autonomous vehicle 111.

The positioning system 123 may be configured to estimate a geographic location of the vehicle 111. The IMU 124 is configured to sense a location and orientation change of the vehicle 111 based on an inertial acceleration. In an embodiment, the IMU 124 may be a combination of an accelerometer and a gyroscope.

The light detection and ranging 125 may sense an object in the ambient environment of the vehicle 111 by using a radio signal. In some embodiments, in addition to sensing the object, the light detection and ranging 125 may be further configured to sense a speed and/or a forward direction of the object.

The laser rangefinder 126 may sense, by using a laser, an object in an environment in which the vehicle 111 is located. In some embodiments, the laser rangefinder 126 may include one or more laser sources, one or more laser scanners, one or more detectors, and other system components.

The camera 127 may be configured to capture a plurality of images of the ambient environment of the vehicle 111. The camera 230 may be a static camera or a video camera.

The control system 114 may be configured to control operations of the vehicle 111 and the components of the vehicle 111. The control system 114 may include various elements, including a steering system 128, an accelerator 129, a brake unit 130, a sensor fusion algorithm 131, a computer vision system 132, a route control system 133, and an obstacle avoidance system 134.

The steering system 128 may be operated to adjust a forward direction of the vehicle 111. For example, in an embodiment, the steering system 128 may be a steering wheel system.

The accelerator 129 is configured to control an operating speed of the engine 119 and then control a speed of the vehicle 111.

The brake unit 130 is configured to control the vehicle 111 to decelerate. The brake unit 130 may slow the wheel 122 down by using friction. In another embodiment, the brake unit 130 may convert kinetic energy of the wheel 122 into a current. The brake unit 130 may reduce a rotation speed of the wheel 122 in another form, to control the speed of the vehicle 111.

The computer vision system 132 may be operated to process and analyze the images captured by the camera 127, to recognize the object and/or a feature in the ambient environment of the vehicle 111. The object and/or feature may include a traffic signal, a road boundary, and an obstacle. The computer vision system 132 may use an object recognition algorithm, a structure from motion (SFM) algorithm, video tracking, and another computer vision technology. In some embodiments, the computer vision system 132 may be configured to map an environment, track an object, estimate a speed of the object, and the like.

The route control system 133 is configured to determine a driving route of the vehicle 111. In some embodiments, the route control system 133 may determine the driving route for the vehicle 111 with reference to data from a sensor, the GPS 123, and one or more predetermined maps.

The obstacle avoidance system 134 is configured to recognize, evaluate, and avoid or otherwise cross a potential obstacle in the environment in which the vehicle 111 is located.

Certainly, in an instance, a component other than those shown and described components may be added to or alternatively included in the control system 114, or some of the shown components may be removed from the control system 114.

The vehicle 111 interacts with an external sensor, another vehicle, another computer system, or a user by using the peripheral device 115. The peripheral device 115 may include a wireless communications system 135, a vehicle-mounted computer 136, a microphone 137, and/or a speaker 138.

In some embodiments, the peripheral device 115 provides a manner for a user of the vehicle 111 to interact with the user interface 118. For example, the vehicle-mounted computer 136 may provide information for the user of the vehicle 111. The user interface 118 may be further used to operate the vehicle-mounted computer 136 to receive input from the user. The vehicle-mounted computer 136 may be operated by using a touchscreen. In another case, the peripheral device 115 may provide a manner for the vehicle 111 to communicate with another device in the vehicle. For example, the microphone 137 may receive audio (such as a voice command or other audio input) from the user of the vehicle 111. Similarly, the speaker 138 may output audio to the user of the vehicle 111.

The wireless communications system 135 may wirelessly communicate with one or more devices directly or via a communications network. For example, the wireless communications system 135 may use third generation (3G) cellular communication such as code-division multiple access (CDMA), Evolution-Data Optimized (EVDO, or a Global System for Mobile Communications (GSM)/General Packet Radio Service (GPRS), or fourth generation (4G) cellular communication such as Long-Term Evolution (LTE), or fifth generation (5G) cellular communication. The wireless communications system 135 may communicate with a wireless local area network (WLAN) by using WI-FI. In some embodiments, the wireless communications system 135 may directly communicate with a device by using an infrared link, BLUETOOTH, or ZIGBEE. In other wireless protocols such as various vehicle communications systems, for example, the wireless communications system 135 may include one or more dedicated short-range communications (DSRC) devices. These devices may include common and/or private data communication between vehicles and/or roadside stations.

The power supply 116 may supply power to various components of the vehicle 111. In an embodiment, the power supply 116 may be a rechargeable lithium-ion or lead-acid battery. One or more battery cells of such a battery may be configured as a power supply to supply power to various components of the vehicle 111. In some embodiments, the power supply 116 and the energy source 120 may be implemented together, as in some fully-electric vehicles.

Some or all functions of the vehicle 111 are controlled by the computer system 117. The computer system 117 may include at least one processor 139. The processor 139 executes an instruction 141 stored in a non-transient computer-readable medium such as a memory 140. The computer system 117 may be alternatively a plurality of computing devices that control individual components or the subsystems of the vehicle 111 in a distributed manner.

The processor 139 may include a conventional processor such as a central processing unit (CPU). Alternatively, the processor may be a dedicated device such as an application-specific integrated circuit (ASIC) or another hardware-based processor. Although FIG. 1A functionally illustrates the processor, the memory, and another element of a computer in a same block, a person of ordinary skill in the art should understand that the processor, the computer, or the memory actually may include a plurality of processors, computers, or memories that may or may not be stored in a same physical housing. For example, the memory may be a hard disk drive or another storage medium different from a storage medium located in a housing of the computer. Therefore, it will be understood that a reference to the processor or computer includes a reference to a set of processors, computers, or memories that may or may not be operated in parallel. Unlike using a single processor to execute the steps described herein, some components, such as a steering component and a deceleration component, each may have its own processor, and the processor performs only computing related to a component-specific function.

In the aspects described herein, the processor may be located far away from the vehicle and wirelessly communicate with the vehicle. In another aspect, some of the processes described herein are executed by the processor disposed in the vehicle, and other of the processes described herein are executed by a remote processor, including a necessary step for performing a single operation.

In some embodiments, the memory 140 may include the instruction 141 (such as program logic), and the instruction 141 may be executed by the processor 139 to execute various functions of the vehicle 111, including those functions described above. The memory 140 may also include an additional instruction, including an instruction for sending data to, receiving data from, interacting with, and/or controlling one or more of the traveling system 112, the sensor system 113, the control system 114, and the peripheral device 115.

In addition to the instruction 141, the memory 140 may further store data, such as a road map, route information, a location, direction, and speed of the vehicle, other such vehicle data, and other information. Such information may be used by the vehicle 111 and the computer system 117 during operation of the vehicle 111 in an autonomous mode, a semi-autonomous mode, and/or a manual mode.

The user interface 118 is configured to provide information for or receive information from the user of the vehicle 111. Optionally, the user interface 118 may include one or more input/output devices in a set of the peripheral devices 115, such as the wireless communications system 135, the vehicle-mounted computer 136, the microphone 137, and the speaker 138.

The computer system 117 may control the functions of the vehicle 111 based on input received from various subsystems (such as the traveling system 112, the sensor system 113, and the control system 114) and from the user interface 118. For example, the computer system 117 may control, by using input from the control system 114, the steering unit 128 to avoid an obstacle detected by the sensor system 113 and the obstacle avoidance system 134. In some embodiments, the computer system 117 may be operated to control many aspects of the vehicle 111 and the subsystems of the vehicle 111.

Optionally, one or more of the foregoing components may be mounted separately from or associated with the vehicle 111. For example, the memory 140 may exist separately from the vehicle 111 partially or completely. The foregoing components may be communicatively coupled together in a wired and/or wireless manner.

Optionally, the foregoing components are merely an example. In actual application, a component may be added to or deleted from the foregoing modules based on an actual requirement. FIG. 1A should not be understood as a limitation on this embodiment of this application.

Optionally, the self-driving car vehicle 111 or computing devices (such as the computer system 117, the computer vision system 132, and the memory 140 in FIG. 1A) associated with the self-driving vehicle 111 may predict behavior of a recognized object based on a characteristic of the recognized object and a status of the ambient environment (such as traffic, rain, or ice on a road). Optionally, all recognized objects depend on mutual behavior. Therefore, all the recognized objects may be considered together to predict behavior of a single recognized object. The vehicle 111 can adjust the speed of the vehicle 111 based on the predicted behavior of the recognized object. In other words, the self-driving car can determine, based on the predicted behavior of the object, a specific stable state (such as acceleration, deceleration, or stop) to which the vehicle needs to adjust. In this process, other factors may be alternatively considered to determine the speed of the vehicle 111, such as a lateral location of the vehicle 111 on a traveling road, a curvature of the road, and proximity degrees of static and dynamic objects.

In addition to providing an instruction for adjusting the speed of the self-driving car, the computing device may further provide an instruction for modifying a steering angle of the vehicle 111, so that the self-driving car follows a given track and/or maintains safe lateral and longitudinal distances from an object (such as a car in a neighboring lane on a road) near the self-driving car.

The vehicle 111 may be a car, a truck, a motorcycle, a bus, a boat, a plane, a helicopter, a lawn mower, a recreational vehicle, an amusement park vehicle, a construction device, a tram, a golf cart, a train, a trolley, or the like. This is not specially limited in this embodiment of this application.

In conclusion, the included instruction 141 may include a related function that can implement the ranging method in the embodiments of this application. When the instruction 141 is executed by the processor 139, the processor 139 can invoke the light detection and ranging 125 included in the vehicle 111, to implement the ranging method in the embodiments of this application, so that the processor 139 implements ranging on a target object by using the light detection and ranging 128.

To better understand the ranging method provided in the embodiments of this application for ranging, the following first describes a specific structure and a specific ranging process of light detection and ranging provided in the other approaches.

Figure 1B:
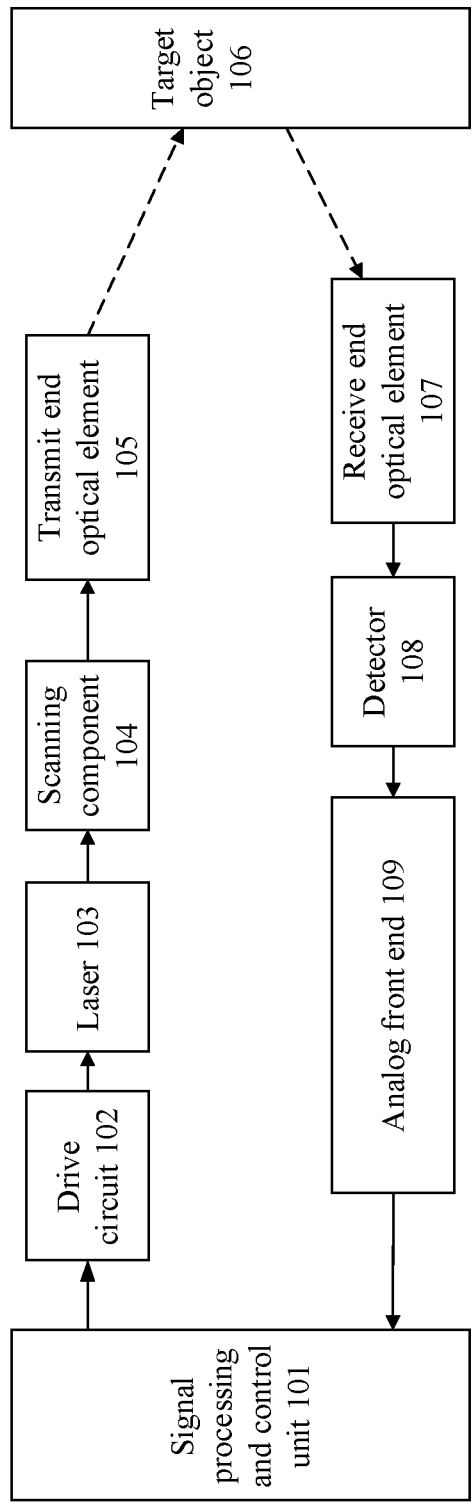
FIG. 1B is a schematic structural diagram of light detection and ranging according to this application.

First, an example description of a structure of the light detection and ranging is provided with reference to FIG. 1B. The light detection and ranging shown in FIG. 1B may be configured to measure a distance between the light detection and ranging and a target object. As shown in FIG. 1B, the light detection and ranging includes a signal processing and control unit 101, a drive circuit 102, a laser 103, a scanning component 104, a transmit end optical element 105, a receive end optical element 107, a detector 108, and an analog front end 109. The signal processing and control unit 101 transmits a detection signal to the drive circuit 102, the drive circuit 102 modulates the detection signal to the laser 103, the laser 103 transmits an optical signal with a pulse, the scanning component 104 and the transmit end optical element 105 scan and shape the optical signal and irradiate the detection signal onto a target object 106, and the target object 106 reflects an optical signal for the detection signal.

After performing focus shaping on the optical signal reflected by the target object 106, the receive end optical element 107 sends the optical signal to the detector 108, and the detector 108 receives the optical signal and converts the optical signal into a current signal.

The analog front end 109 in this embodiment may include components such as a transimpedance amplifier (TIA) and an ADC. The transimpedance amplifier may amplify the current signal into a voltage signal, and the analog to digital converter may convert the analog voltage signal into a digital signal. The ADC outputs the digital signal to the signal processing and control unit 101, so that the signal processing and control unit 101 can obtain time information and echo signal waveform information.

The time information obtained by the signal processing and control unit 101 is light transmission time t during which the detection signal is transmitted by the transmit end optical element 105 to the target object and then reflected to the receive end optical element 107. The signal processing and control unit 101 may calculate the distance R between the light detection and ranging and the target object according to the following formula:

$$R = \frac{ct}{2n},$$

where c is a speed of light and is approximately 299792458 meters per second (m/s), and n is a refractive index in a medium. The medium is a medium in which the detection signal is located in a transmission process. For example, if the detection signal is transmitted in air, n is 1.

The signal processing and control unit 101 can calculate the distance between the light detection and ranging and the target object by using the foregoing formula. To improve ranging accuracy, a signal-to-noise ratio of an echo signal may be improved by using a standard averaging algorithm. Because the signal-to-noise ratio of the echo signal is improved, the light transmission time t may be accurately determined from the echo signal. The signal-to-noise ratio is defined as a ratio of a peak amplitude of a signal to a root mean square of noise.

After N times of independent waveform averaging, a net signal-to-noise ratio $SnO_{NET}$ is shown in the following formula:

$$SNR_{NET} = N^{\frac{1}{2}} SNR_W,$$

where SNR is a signal-to-noise ratio of an echo signal received by the light detection and ranging by using a sent detection signal. To improve ranging accuracy, the light detection and ranging may receive, by using N detectors, an optical signal reflected by the target object, to obtain N echo signals. If net signal-to-noise ratios of the N echo signals are all $SNR_W$, the signal processing and control unit 101 can average the signal-to-noise ratios of the received N echo signals, to obtain the net signal-to-noise ratio $SNR_{NET}$.

The following describes the reason why the signal-to-noise ratio of the echo signal is improved after the N times of independent waveform averaging.

In a process in which the light detection and ranging performs ranging on a same target object, if the light detection and ranging may obtain a plurality of echo signals by using a plurality of detectors, the light detection and ranging may perform waveform averaging on the plurality of echo signals. A location of the target object is fixed, and in different echo signals reflected by the target object, pulse signals included in the echo signals are correlated with each other, noise included in the echo signals are uncorrelated with each other, and the pulse signals and the noise that are included in the echo signals are also uncorrelated with each other. Therefore, in a process of performing signal averaging on the plurality of echo signals, the correlated pulse signals are retained, and the uncorrelated noise mutually cancels. It can be learned that, waveform averaging is performed on the plurality of echo signals, so that the pulse signals and the noise that are generated by the echo signals can be clearly distinguished from each other.

However, the manner of improving the signal-to-noise ratio of the echo signal in a waveform averaging manner has the following disadvantage. In the waveform averaging manner, a fixed value N needs to be preset and N is a quantity of times of waveform averaging that needs to be performed. Therefore, the N value may be set excessively, and one time of ranging may need to be completed for relatively long time, causing a slow response of the light detection and ranging system and a reduction in ranging efficiency. In addition, a case in which the detection signal is irradiated onto different locations of the target object, that is, impact of echo signals reflected by different locations of the target object on ranging, is not considered in the waveform averaging manner. It can be learned that, in other approaches, a spatial correlation of the target object is not considered, causing low ranging accuracy.

The spatial correlation means that the target object has a specific volume, different location areas of the target object may be mapped to a plurality of neighboring pixels of the light detection and ranging, and there is a specific correlation between pulses in the pixels in terms of distance, amplitude, shape, or the like. Therefore, a signal-to-noise ratio of an echo signal can be improved by determining a spatial correlation between echo signals of neighboring pixels.

Figure 2:
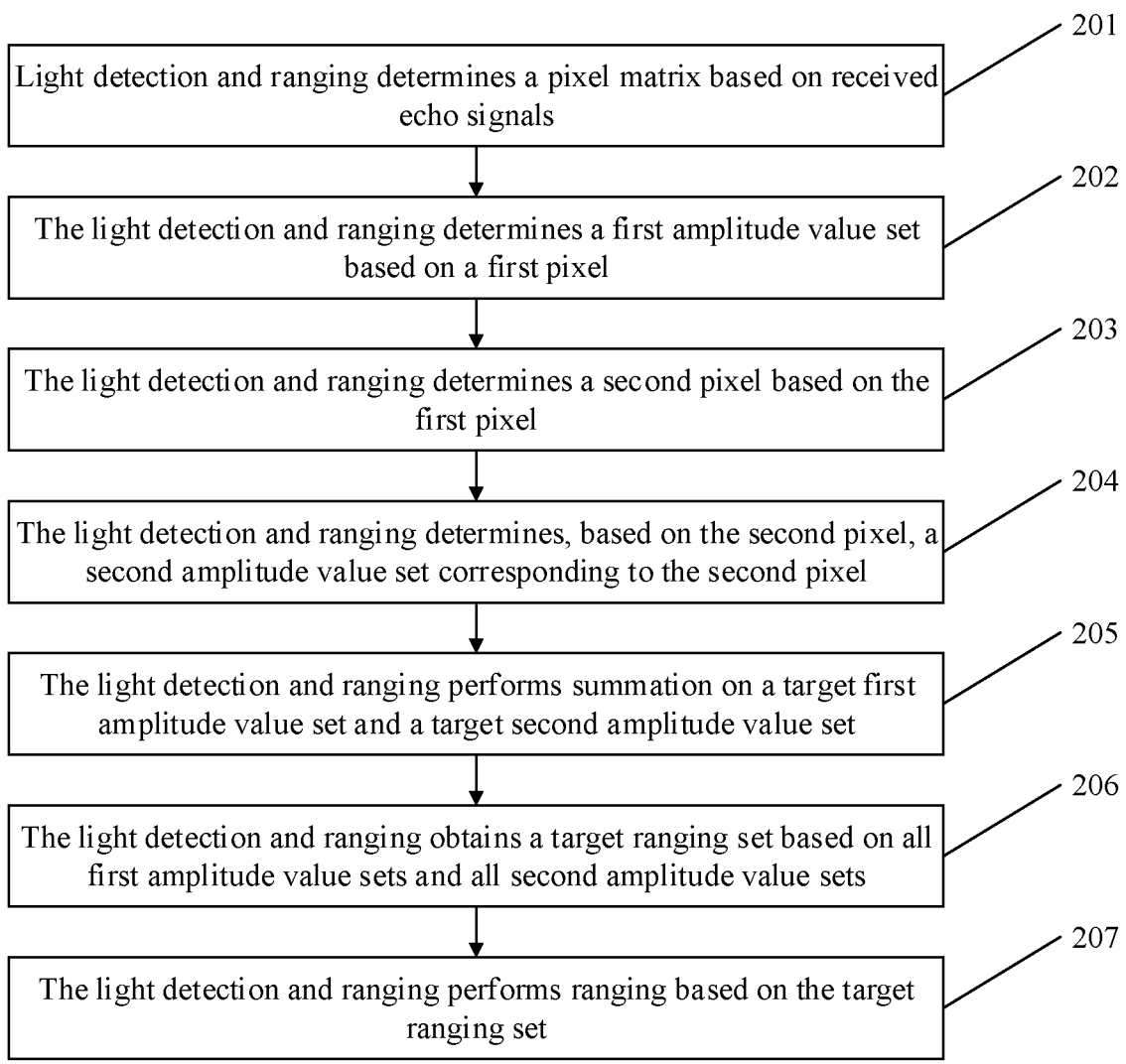
FIG. 2 is a flowchart of steps of an embodiment of a ranging method according to this application.

Based on the structure of the light detection and ranging shown in FIG. 1B, the following describes, based on FIG. 2, a specific execution process of the ranging method provided in this application.

To better understand the ranging method in the embodiments of this application, the echo signal in the embodiments of this application is first described.

A transmit end optical element of light detection and ranging (the transmit end optical element may be an antenna of the light detection and ranging) can transmit a detection signal of a pulsed electric wave, where the detection signal can be irradiated onto a target object, so that a receive end optical element can receive an optical signal reflected by the target object. In a process of transmitting the detection signal, the transmit end optical element may output the detection signal based on a specified scanning period. If the light detection and ranging includes a plurality of transmit end optical elements, different transmit end optical elements may have different transmit angles, and in one scanning period, the plurality of transmit end optical elements included in the light detection and ranging can transmit detection signals at different transmit angles at a same transmit moment. If the light detection and ranging includes one transmit end optical element, in one scanning period, the transmit end optical element can be rotated to different transmit angles, and transmit detection signals when the transmit end optical element is located at different transmit angles. It can be learned that the transmit end optical element can repeatedly transmit the detection signal in one scanning period. The transmit angle is a horizontal-direction transmit angle and a vertical-direction transmit angle at which the transmit end optical element transmits a detection signal.

The receive end optical element of the light detection and ranging performs sampling on optical signals reflected by the target object in one period, and performs processing based on a sampled optical signal to generate an echo signal. It can be learned that the echo signal obtained by the light detection and ranging may include or not include a pulse signal reflected by the target.

Step 201: The light detection and ranging determines a pixel matrix based on received echo signals.

The following first describes the pixel matrix.

A signal processing and control unit of the light detection and ranging may determine the pixel matrix for a same target object, and the pixel matrix includes a two-dimensional coordinate system. A horizontal coordinate of the two-dimensional coordinate system is a horizontal-direction transmit angle of a transmit angle, and a vertical coordinate of the two-dimensional coordinate system is a vertical-direction transmit angle of the transmit angle.

Each time the light detection and ranging transmits a detection signal for the target object, the signal processing and control unit can draw the detection signal in the two-dimensional coordinate system based on a transmit angle corresponding to the detection signal, to generate a pixel. Further, it can be learned that the pixel matrix includes pixels corresponding to all detection signals transmitted by the light detection and ranging, so that the pixel matrix is raster data, that is, the pixel matrix may be represented by vertically and horizontally arranging a plurality of pixels as a raster (matrix of m pixels×n pixels).

Due to a linear propagation nature of an electric wave, the signal processing and control unit can obtain an echo signal reflected by the target object based on each detection signal. The echo signal is a signal received during a period from a time at which the transmit end optical element transmits a detection signal at a transmit angle to a time at which the transmit end optical element transmits a next detection signal.

The echo signal represents a status on a ray drawn in an orientation of the transmit end optical element (that is, at a transmit angle at which the transmit end optical element transmits a detection signal) starting from the light detection and ranging. In addition, when the transmit end optical element transmits a detection signal in a direction of the ray, a pulse signal generated by a target object closer to the light detection and ranging is received by the light detection and ranging at an earlier moment, and a pulse signal generated by a target object farther away from the light detection and ranging is received at a later moment. Therefore, an echo signal includes a transmit angle corresponding to the echo signal, information about whether a target object exists on the foregoing ray, and the like.

The pixel matrix in this embodiment includes all pixels in one frame obtained by the light detection and ranging. All the pixels in the frame in this embodiment are pixels generated by the light detection and ranging for echo signals received in a same scanning period by using a detector. For a specific description of the scanning period, refer to the foregoing description. Details are not described herein again. A quantity of frames included in the pixel matrix is not limited in this embodiment.

Step 202: The light detection and ranging determines a first amplitude value set based on a first pixel.

The light detection and ranging in this embodiment determines the first pixel from the pixel matrix. The first pixel is a pixel included in the pixel matrix, and a specific location of the first pixel in the pixel matrix is not limited in this embodiment. When the light detection and ranging determines the first pixel, the light detection and ranging can determine a first echo signal corresponding to the first pixel. A horizontal coordinate of the first pixel in the two-dimensional coordinate system is a horizontal-direction transmit angle of a transmit angle of a first detection signal, a vertical coordinate of the first pixel in the two-dimensional coordinate system is a vertical-direction transmit angle of the transmit angle of the first detection signal, and the first detection signal is a detection signal corresponding to the first echo signal, that is, an echo signal reflected by the target object for the first detection signal is the first echo signal.

The light detection and ranging may determine, from the first echo signal in a time sequence, all first sampling points included in the first echo signal. In this embodiment, for example, there is an equal time interval between any two neighboring first sampling points determined by the light detection and ranging from the first echo signal, and the light detection and ranging sequentially calculates amplitude values corresponding to all the first sampling points included in the first echo signal, to separately calculate an amplitude value corresponding to each of the plurality of first sampling points that are set at equal intervals in the first echo signal. The amplitude value corresponding to the first sampling point is a voltage or a minimum unit (least significant bit (LSB)) of a full scale input range of an ADC.

This is essentially equivalent to setting a plurality of moments at a specific time interval from a transmit moment at which the light detection and ranging transmits a detection signal, where each set moment is one first sampling point, and separately detecting an amplitude value of the signal at each first sampling point.

The light detection and ranging may create, for the first pixel, data information corresponding to the first pixel. The data information may include the first echo signal corresponding to the first pixel, and the first echo signal includes the amplitude values corresponding to all the first sampling points of the first echo signal.

In this embodiment, when the light detection and ranging determines the first pixel and the first echo signal corresponding to the first pixel, the light detection and ranging determines the first amplitude value set corresponding to the first pixel. The first amplitude value set includes a plurality of first sampling points of the first echo signal and an amplitude value corresponding to each first sampling point.

A distribution status of the plurality of first sampling points included in the first amplitude value set is not limited in this embodiment. For example, the plurality of first sampling points included in the first amplitude value set may be arranged in a time sequence in which sampling is performed on the first echo signal. For another example, the plurality of first sampling points included in the first amplitude value set may be randomly arranged.

For a plurality of echo signals reflected by a same target object, the light detection and ranging detects, in the plurality of reflected echo signals, that sampling moments of pulse signals may be the same or adjacent. To improve ranging accuracy, this embodiment provides an example description by using an example in which the plurality of first sampling points included in the first amplitude value set are arranged in the time sequence in which sampling is performed on the first echo signal.

The light detection and ranging in this embodiment may determine one or more first amplitude value sets for the first pixel. A specific quantity of first amplitude value sets determined by the light detection and ranging is not limited in this embodiment, and a specific quantity of first sampling points included in the first amplitude value set is not limited in this embodiment.

The following describes, with reference to specific steps, an optional manner in which the light detection and ranging in this embodiment determines the first amplitude value set.

Step 2021: The light detection and ranging determines a digital echo sequence corresponding to the first pixel.

Coordinates of the first pixel in the two-dimensional coordinate system are (x, y), and the light detection and ranging has received the first echo signal corresponding to the first pixel. The digital echo sequence corresponding to the first pixel is $r_{x,y}(n)$, where n represents a quantity of first sampling points included in the first echo signal. For example, if the light detection and ranging determines 2000 sampling points for each echo signal, a value of n is 2000. The digital echo sequence in this embodiment further includes the amplitude value corresponding to each first sampling point in the first echo signal.

Step 2022: The light detection and ranging obtains a target list.

The target list includes amplitude values corresponding to N inflection points in the digital echo sequence, N is a positive integer greater than or equal to 1, and the amplitude value corresponding to the inflection point is greater than an amplitude value corresponding to a sampling point adjacent to the inflection point.

Optionally, the light detection and ranging may sort, in descending order, amplitude values corresponding to all inflection points included in the digital echo sequence, to select the first N inflection points to constitute the target list. This embodiment provides an example description by using an example in which the target list is set in this manner.

A specific quantity of N is not limited in this embodiment, provided that N is a positive integer greater than or equal to 1, and a value of N is less than a quantity of sampling points included in the digital echo sequence.

For example, if the digital echo sequence includes 2000 sampling points, when the value of N is 10, the light detection and ranging determines that the target list includes 10 inflection points determined from the 2000 sampling points in the digital echo sequence, and combines the 10 inflection points into the target list.

Step 2023: The light detection and ranging determines the first amplitude value set from the digital echo sequence.

The first amplitude value set in this embodiment includes at least one amplitude value in the target list.

The following describes a process in which the light detection and ranging determines the first amplitude value set.

First, the light detection and ranging determines, from the N amplitude values included in the target list, a first amplitude value of a target first sampling point ranked first. Herein provides an example description by using an example of how to obtain the first amplitude value set based on the target first sampling point ranked first, provided that the light detection and ranging can determine, by using the following method, the first amplitude value set based on any one of the N inflection points included in the target list.

Next, the light detection and ranging truncates, in a sequence from front to back based on sampling moments by using the target first sampling point as a center, (2*M+1) first sampling points from all first sampling points included in the digital echo sequence. A specific value of M is not limited in this embodiment, provided that M is a positive integer greater than or equal to 1.

For example, if the value of M is 10, the light detection and ranging truncates, by using the target first sampling point as the center from all the first sampling points that are included in the digital echo sequence and that are sorted in a sequence from front to back based on sampling moments, 21 sampling points sorted in a sequence from front to back based on sampling moments, where a sampling point at a middle location in the 21 sampling points is the target first sampling point.

In this embodiment, for example, the first amplitude value set is denoted as $w_{x,y,i}(n)$, $0 < n \leq 2*M+1$, and $0 < i \leq N$, where $0 < n \leq 2*M+1$ indicates that the first sampling points included in the first amplitude value set are the truncated (2*M+1) sampling points, and 0<i≤N indicates that the first amplitude value set includes one of the N amplitude values in the target list.

Further, the data information created by the light detection and ranging for the first pixel stores the digital echo sequence corresponding to the first pixel, all first amplitude value sets $w_{x,y,i}(n)$ determined by the light detection and ranging for the first pixel, and location information [$n_{i,min}$, $n_{i,max}$] of each first amplitude value set $w_{x,y,i}(n)$ in $r_{x,y}(n)$, where $n_{i,min}$ represents the first sampling point of a plurality of sampling points in the first amplitude value set that are truncated from the digital echo sequence and that are sequentially sorted from front to back based on sampling moments, and $n_{i,max}$ represents the last sampling point of the plurality of sampling points in the first amplitude value set that are truncated from the digital echo sequence and that are sequentially sorted from front to back based on the sampling moments.

Step 203: The light detection and ranging determines a second pixel based on the first pixel.

The light detection and ranging determines the second pixel adjacent to the first pixel from the created pixel matrix. A specific quantity of second pixels is not limited in this embodiment, in other words, there may be one or more second pixels in this embodiment.

Adjacent in this embodiment may mean that a transmit angle corresponding to the first pixel is adjacent to a transmit angle corresponding to the second pixel.

It can be learned from the foregoing description that, the light detection and ranging draws a detection signal in the two-dimensional coordinate system based on a transmit angle of the detection signal, so that each pixel in the two-dimensional coordinate system corresponds to one detection signal. When the transmit angle corresponding to the first pixel is adjacent to the transmit angle corresponding to the second pixel, the first pixel and the second pixel are in an adjacent state in location in the two-dimensional coordinate system.

When the first pixel is determined, the light detection and ranging may determine an associated area that includes the first pixel, and determine a size of the associated area. The associated area includes A pixels in a horizontal coordinate direction and includes B pixels in a vertical coordinate direction, a value of A is less than or equal to a value of M that is a quantity of pixels included in the pixel matrix in the horizontal coordinate direction, and a value of B is less than or equal to a value of N that is a quantity of pixels included in the pixel matrix in the vertical coordinate direction. A specific quantity of pixels included in the associated area is not limited in this embodiment, provided that the associated area includes a plurality of pixels. A specific location of the first pixel in the associated area is not limited in this embodiment. For example, the first pixel may be located at any location such as a start location, a middle location, or an end location of the associated area.

When the light detection and ranging determines the associated area, the light detection and ranging may determine that pixels other than the first pixel in the associated area are all second pixels.

A specific location of the second pixel is determined by using the associated area, so that there are the following several optional location relationships between the location of the first pixel and the location of the second pixel.

For example, a horizontal coordinate of the first pixel is the same as a horizontal coordinate of the second pixel, and a vertical coordinate of the first pixel is different from a vertical coordinate of the second pixel. This indicates that transmit angles respectively corresponding to the first pixel and the second pixel are the same in a horizontal direction but different in a vertical direction. That is, the first pixel and the second pixel are two pixels located in a same column and different rows in the pixel array included in the two-dimensional coordinate system.

For another example, a vertical coordinate of the first pixel is same as a vertical coordinate of the second pixel, and a horizontal coordinate of the first pixel is different from a horizontal coordinate of the second pixel. This indicates that transmit angles respectively corresponding to the first pixel and the second pixel are the same in a vertical direction but different in a horizontal direction. That is, the first pixel and the second pixel are two pixels located in a same row and different columns in the pixel array included in the two-dimensional coordinate system.

In the foregoing two examples, the first pixel is separated from the second pixel by zero pixels or at least one pixel. To improve ranging accuracy, the first pixel is enabled to be separated from the second pixel by as few pixels as possible. For example, the light detection and ranging may determine, as second pixels, pixels separated from the first pixel by zero pixels, one pixel, or two pixels.

For another example, a vertical coordinate of the first pixel is different from a vertical coordinate of the second pixel, and a horizontal coordinate of the first pixel is also different from a horizontal coordinate of the second pixel. This indicates that transmit angles respectively corresponding to the first pixel and the second pixel are different both in a vertical direction and a horizontal direction. That is, the first pixel and the second pixel are two pixels located in different rows and different columns in the pixel array included in the two-dimensional coordinate system.

During ranging on the target object, in a process in which the target object reflects echo signals for different detection signals, if the detection signals are closer to each other, pixels corresponding to reflected echo signals are closer to each other. To improve ranging accuracy, a distance between the first pixel and the second pixel are enabled to be as short as possible, that is, the first pixel and the second pixel are enabled to be as close as possible in the two-dimensional coordinate system.

To better understand a process in which the light detection and ranging determines the second pixel based on the first pixel, the following describes the process with reference to different scanning modes of the light detection and ranging.

Figure 3:
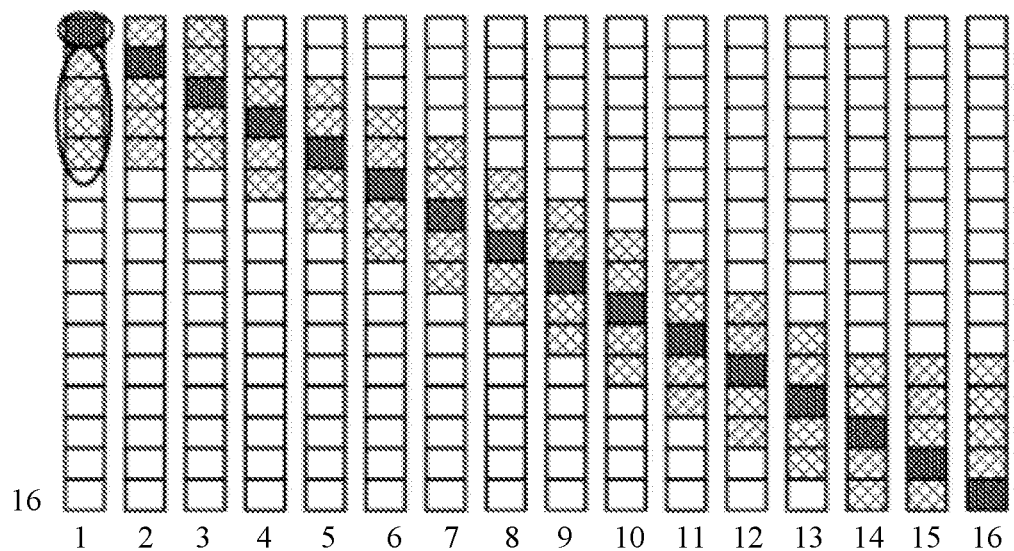
FIG. 3 is a schematic diagram of an application scenario according to this application.

An example description is provided by using an example in which a scanning mode is "line transmission-line reception". The "line transmission-line reception" means that in one scanning period, the light detection and ranging may transmit detection signals at a same horizontal-direction transmit angle and different vertical-direction transmit angles at a same transmit moment, so that the light detection and ranging can receive a plurality of echo signals reflected based on the transmitted detection signals. FIG. 3 is shown as an example. In the example shown in FIG. 3, the light detection and ranging may transmit detection signals at a same horizontal-direction transmit angle and different vertical-direction transmit angles at a same transmit moment, and the light detection and ranging determines 16 pixels for the transmitted detection signals from the two-dimensional coordinate system.

As shown in FIG. 3 as an example, the light detection and ranging may determine 16 pixels for a transmit moment 1. The 16 pixels all have a same horizontal-direction transmit angle and have different vertical-direction transmit angles, and the 16 pixels are distributed as one column of pixels in the two-dimensional coordinate system created by the light detection and ranging. By analogy, the light detection and ranging may determine 16 pixels for each of a transmit moment 2, a transmit moment 3, . . . , and a transmit moment 16.

For better description, as shown in FIG. 3, in 16 pixels determined at a same transmit moment, a pixel with a largest vertical-direction transmit angle is used as a pixel 1, for example, in the 16 pixels corresponding to the transmit moment 1 shown in FIG. 3, a pixel 1 is a pixel farthest away from the horizontal coordinate in one column of pixels that correspond to the transmit moment 1, and a pixel with a smallest vertical-direction transmit angle is used as a pixel 16, for example, in the 16 pixels corresponding to the transmit moment 1 shown in FIG. 3, a pixel 16 is a pixel closest to the horizontal coordinate in the column of pixels that correspond to the transmit moment 1.

An example description is provided by using an example in which the associated area determined by the light detection and ranging in this embodiment may be set in one column, and the light detection and ranging predetermines that the associated area includes five pixels. That is, in this example, all pixels in the associated area correspond to a same transmit moment.

A specific manner in which the light detection and ranging selects the second pixel is not limited in this embodiment, provided that the second pixel selected by the light detection and ranging is as close as possible to the first pixel. In the "line transmission-line reception" mode, the light detection and ranging may determine, from one column of pixels in which the first pixel is located, the second pixel adjacent to the first pixel. A specific example is as follows.

For example, if the light detection and ranging determines that the first pixel is the pixel 1 corresponding to the transmit moment 1, the light detection and ranging may determine that second pixels are a pixel 2 (the pixel is separated from the first pixel by zero pixels), a pixel 3 (the pixel is separated from the first pixel by one pixel), a pixel 4 (the pixel is separated from the first pixel by two pixels), and a pixel 5 (the pixel is separated from the first pixel by three pixels).

For another example, if the light detection and ranging determines that the first pixel is a pixel 2 corresponding to the transmit moment 2, the light detection and ranging may determine that second pixels are a pixel 1 (the pixel is separated from the first pixel by zero pixels), a pixel 3 (the pixel is separated from the first pixel by zero pixels), a pixel 4 (the pixel is separated from the first pixel by one pixel), and a pixel 5 (the pixel is separated from the first pixel by two pixels).

For another example, if the light detection and ranging determines that the first pixel is a pixel 3 corresponding to the transmit moment 3, the light detection and ranging may determine that second pixels are a pixel 1 (the pixel is separated from the first pixel by one pixel), a pixel 2 (the pixel is separated from the first pixel by zero pixels), a pixel 4 (the pixel is separated from the first pixel by zero pixels), and a pixel 5 (the pixel is separated from the first pixel by one pixel).

By analogy, details are not described. It should be noted that a specific process of determining the second pixel based on the first pixel is not limited in this embodiment, provided that the second pixel is as adjacent as possible to the first pixel in the pixel matrix. It can be learned that, in a "line transmission-line reception" scenario, the first pixel and the second pixel that are determined by the light detection and ranging both correspond to a same horizontal-direction transmit angle and respectively correspond to different vertical-direction transmit angles. A vertical-direction transmit angle of the second pixel selected by the light detection and ranging is adjacent to a vertical-direction transmit angle of the first pixel.

It should be noted that, in the foregoing example, a plurality of detection signals transmitted by the light detection and ranging at a same transmit moment have a same horizontal-direction transmit angle and have different vertical-direction transmit angles. In another example, a plurality of detection signals transmitted by the light detection and ranging at a same transmit moment may have a same vertical-direction transmit angle and have different horizontal-direction transmit angles, so that in this scenario, a vertical-direction transmit angle corresponding to the second pixel determined by the light detection and ranging is the same as a vertical-direction transmit angle of the first pixel, and a horizontal-direction transmit angle corresponding to the second pixel is different from a horizontal-direction transmit angle of the first pixel.

Figure 4:
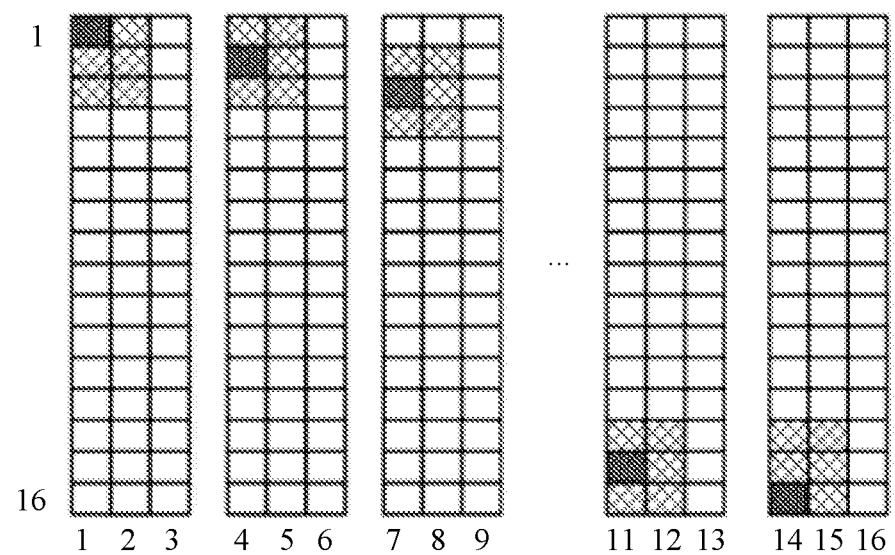
FIG. 4 is a schematic diagram of another application scenario according to this application.

The "line transmission-line reception" scanning mode is still used as an example. As shown in FIG. 4, the light detection and ranging may determine 16 pixels for each transmit moment. As shown in FIG. 4, 16 transmit moments are included. A transmit moment 1 corresponds to a column 1, a transmit moment 2 corresponds to a column 2, a column 3 corresponds to a transmit moment 3, and so on. 16 pixels included in each column correspond to a same horizontal-direction transmit angle and correspond to different vertical-direction transmit angles, and pixels in a same row at different transmit moments correspond to a same vertical-direction transmit angle and correspond to different horizontal-direction transmit angles.

In this example, the association area determined by the light detection and ranging includes six pixels, the association area is of a square structure, and the association area includes two pixels in a horizontal axis direction and includes three pixels in a vertical axis direction. In addition, in this example, the first pixel is located at a start transmit angle in the association area. The start transmit angle means that the first pixel has a lowest horizontal-direction transmit angle in a plurality of pixels included in the association area. It should be noted that the description of a quantity of second pixels determined by the light detection and ranging in this embodiment is an optional example and is not limited.

In this example, the light detection and ranging may determine the second pixel only in columns corresponding to a transmit moment at which the first pixel is located and a next moment or a previous moment of the transmit moment, so that efficiency of determining the second pixel is improved, and response time of the light detection and ranging system is shortened. In this example, an example description is provided by using an example in which the second pixel is determined from columns corresponding to the transmit moment at which the first pixel is located and the next moment of the transmit moment.

In the example shown in FIG. 4, an example description is provided by using an example in which the first pixel is located in a pixel 1 in the column 1 corresponding to the transmit moment 1, and the associated area determined by the light detection and ranging includes some pixels in the column 1 corresponding to the transmit moment 1 and some pixels in the column 2 corresponding to the transmit moment 2, so that a plurality of second pixels in the associated area that are determined by the light detection and ranging can be set around the first pixel.

The light detection and ranging may select the second pixel from a same column as the first pixel, that is, the light detection and ranging may determine a pixel 2 (separated from the first pixel by zero pixels) and a pixel 3 (separated from the first pixel by one pixel) of the column 1 from the column 1 as second pixels.

Further, optionally, the light detection and ranging may select the second pixel from a different column from the first pixel, that is, the light detection and ranging may determine a pixel 1 of the column 2, a pixel 2 of the column 2, and a pixel 3 of the column 2 from the column 2 as second pixels, so that a distance between each of the second pixels in the column 2 and the first pixel is as short as possible.

In this example, the second pixel may be alternatively selected from the column 3. For a specific process of selecting the second pixel from the column 3, refer to the process of selecting the second pixel from the column 2. Details are not described, provided that the second pixel determined by the light detection and ranging is as close as possible to the first pixel.

It can be learned that, when the associated area includes multi-row and multi-column pixels, the second pixel may be a pixel in a same column as the first pixel or a pixel in a different column from the first pixel. If the second pixel is a pixel in a different column from the first pixel, a column in which the first pixel is located needs to be separated, by at least zero columns or at least one column, from the column in which the second pixel is located.

Alternatively, the first pixel in this embodiment may be located in a pixel 2 in a column 4 corresponding to a transmit moment 4, or may be located in a pixel 3 in a column 7 corresponding to a transmit moment 7, or may be located in a pixel 16 in a column 14 corresponding to a transmit moment 14, or the like. For a specific manner in which the light detection and ranging determines the second pixel in this embodiment, refer to the foregoing specific process of determining the second pixel for the first pixel corresponding to the transmit moment 1. Details are not described, provided that the second pixel is adjacent to the second pixel, so that a plurality of second pixels can be set around the first pixel.

Alternatively, refer to FIG. 5 below. In an example shown in FIG. 5, the associated area determined by the light detection and ranging includes nine pixels, the associated area is of a square structure, and the associated area includes three pixels in a horizontal axis direction and includes three pixels in a vertical axis direction. In this example, the first pixel is located at a middle transmit angle in the associated area. The middle transmit angle means that in a plurality of pixels included in the associated area, the first pixel has a horizontal-direction transmit angle of a middle size. It should be noted that the description of a quantity of second pixels determined by the light detection and ranging in this example is an optional example and is not limited.

Figure 5:
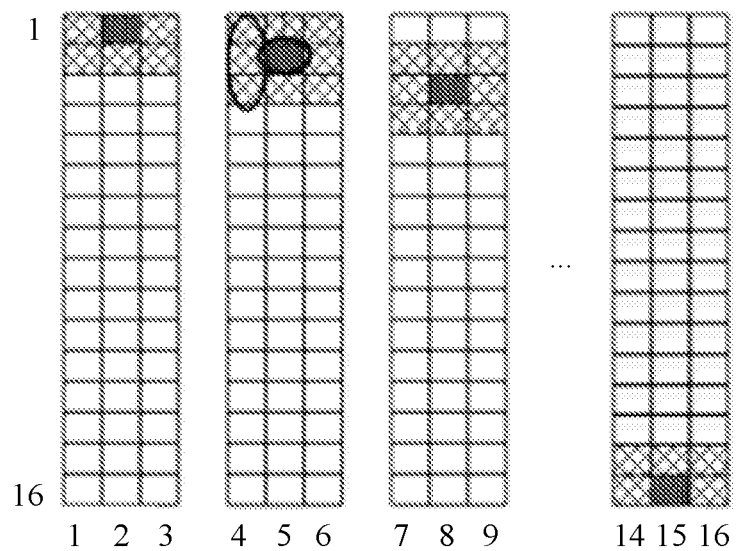
FIG. 5 is a schematic diagram of another application scenario according to this application.

As shown in FIG. 5, for example, the first pixel is located in a pixel 2 in a column 5 corresponding to a transmit moment 5, and the associated area determined by the light detection and ranging includes some pixels in a column 4 corresponding to a transmit moment 4, the column 5 corresponding to the transmit moment 5, and a column 6 corresponding to a transmit moment 6, so that a plurality of second pixels in the associated area that are determined by the light detection and ranging can be set around the first pixel.

The light detection and ranging may select the second pixel from a same column as the first pixel, that is, the light detection and ranging may determine a pixel 1 (separated from the first pixel by zero pixels) and a pixel 3 (separated from the first pixel by zero pixels) of the column 5 from the column 5 as second pixels.

Further, optionally, the light detection and ranging may select the second pixel from a different column from the first pixel, that is, the light detection and ranging may determine a pixel 1 of the column 4, a pixel 2 of the column 4, and a pixel 3 of the column 4 from the column 4 as second pixels, so that a distance between each of the second pixels in the column 4 and the first pixel is as short as possible.

Further, optionally, the light detection and ranging may determine a pixel 1 of the column 6, a pixel 2 of the column 6, and a pixel 3 of the column 6 from the column 6 as second pixels, so that a distance between each of the second pixels in the column 6 and the first pixel is as short as possible.

Alternatively, refer to FIG. 6 below. In an example shown in FIG. 6, the associated area determined by the light detection and ranging includes six pixels, the associated area is of a square structure, and the associated area includes two pixels in a horizontal axis direction and includes three pixels in a vertical axis direction. In this example, the first pixel is located at an end transmit angle in the associated area. The end transmit angle means that in a plurality of pixels included in the associated area, the first pixel has a largest horizontal-direction transmit angle. It should be noted that the description of a quantity of second pixels determined by the light detection and ranging in this example is an optional example and is not limited.

Figure 6:
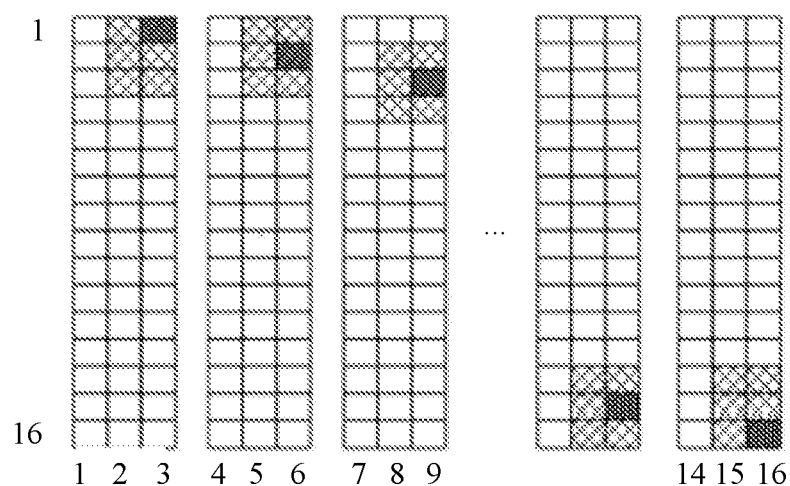
FIG. 6 is a schematic diagram of another application scenario according to this application.

As shown in FIG. 6, for example, the first pixel is located in a pixel 1 in a column 3 corresponding to a transmit moment 3, and the associated area determined by the light detection and ranging includes some pixels in a column 2 corresponding to a transmit moment 2 and the column 3 corresponding to the transmit moment 3, so that a plurality of second pixels in the associated area that are determined by the light detection and ranging can be set around the first pixel.

The light detection and ranging may select the second pixel from a same column as the first pixel, that is, the light detection and ranging may determine a pixel 2 (separated from the first pixel by zero pixels) and a pixel 3 (separated from the first pixel by zero pixels) of the column 3 from the column 3 as second pixels.

Further, optionally, the light detection and ranging may select the second pixel from a different column from the first pixel, that is, the light detection and ranging may determine a pixel 1 of the column 2, a pixel 2 of the column 2, and a pixel 3 of the column 2 from the column 2 as second pixels, so that a distance between each of the second pixels in the column 2 and the first pixel is as short as possible.

The light detection and ranging may be alternatively applied to a "plane transmission-plane reception" scenario, for example, flash LiDAR, and a "point reception-point transmission" scenario, for example, two-dimensional (2D) scanning, to determine the neighboring second pixel based on the first pixel.

A specific process of how to determine the second pixel based on the first pixel in another scenario is not limited in this embodiment, provided that the second pixel selected by the light detection and ranging is as adjacent as possible to the first pixel in the pixel matrix.

Step 204: The light detection and ranging determines, based on the second pixel, a second amplitude value set corresponding to the second pixel.

When the light detection and ranging determines at least one second pixel corresponding to the first pixel, the light detection and ranging may determine a neighboring digital echo sequence corresponding to each second pixel. For a specific process in which the light detection and ranging determines the neighboring digital echo sequence, refer to the specific process in which the light detection and ranging determines the digital echo sequence. Details are not described in this embodiment.

Figure 7:
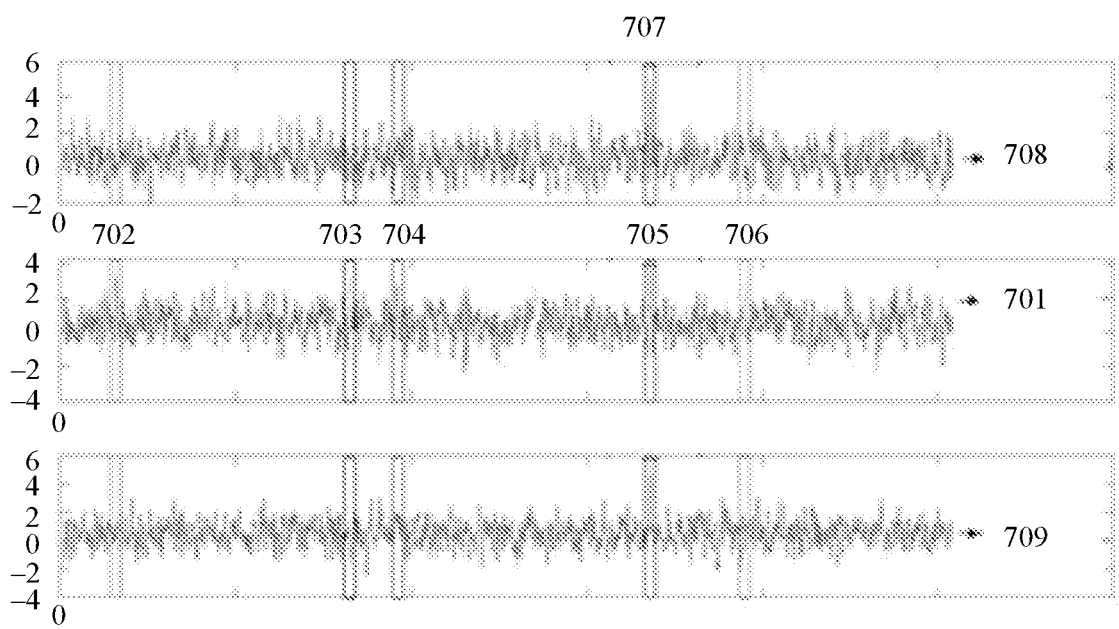
FIG. 7 is a schematic diagram of another application scenario according to this application.

The following describes, with reference to FIG. 7, a specific process in which the light detection and ranging determines a second amplitude value set from the neighboring digital echo sequence.

First, as shown in FIG. 7, for example, the light detection and ranging determines five first amplitude value sets from a digital echo sequence 701: a first amplitude value set 702, a first amplitude value set 703, a first amplitude value set 704, a first amplitude value set 705, and a first amplitude value set 706. The light detection and ranging determines a target first amplitude value set, where the target first amplitude value set is any one of at least one first amplitude value set corresponding to the first pixel. In this example, an example description is provided by using an example in which the target first amplitude value set is the first amplitude value set 705 shown in FIG. 7.

Next, the light detection and ranging determines a location $[n_{i,min}, n_{i,max}]$ of the target first amplitude value set in the digital echo sequence, where $n_{i,min}$ represents a location, in the digital echo sequence, of the first sampling point in a plurality of first sampling points that are included in the target first amplitude value set and that are sorted from front to back based on sampling moments, and $n_{i,max}$ represents a location, in the digital echo sequence, of the last sampling point in the plurality of first sampling points that are included in the target first amplitude value set and that are sorted from front to back based on the sampling moments.

For example, when the digital echo sequence includes 500 sampling points and the target first amplitude value set includes 50 sampling points, a location $[n_{i,min}=150, n_{i,max}=200]$ of the target first amplitude value set in the digital echo sequence is used as an example, where $n_{i,min}=150$ indicates that the location, in the digital echo sequence, of the first sampling point included in the target first amplitude value set is the $150^{th}$ sampling point, and $n_{i,max}=200$ indicates that the location, in the digital echo sequence, of the last sampling point included in the target first amplitude value set is the $200^{th}$ sampling point.

Further, when the light detection and ranging determines the target first amplitude value set, the light detection and ranging may truncate, from a same location in the neighboring digital echo sequence, a target second amplitude value set corresponding to the target first amplitude value set. Still referring to FIG. 7 as an example, a location of a target second amplitude value set 707 in a neighboring digital echo sequence 708 is $[n_{i,min}=150, n_{i,max}=200]$. It can be learned that $n_{i,min}=150$ represents a location, in the neighboring digital echo sequence, of the first sampling point included in the target second amplitude value set is the $150^{th}$ sampling point, and $n_{i,max}=200$ represents a location, in the neighboring digital echo sequence, of the last sampling point included in the target second amplitude value set is the $200^{th}$ sampling point.

When the light detection and ranging determines a plurality of neighboring digital echo sequences, as shown in FIG. 7 as an example, the light detection and ranging determines that the neighboring digital echo sequences include the neighboring digital echo sequence 708 and a neighboring digital echo sequence 709. For a process in which the light detection and ranging determines a second amplitude value set from the neighboring digital echo sequence 709, refer to the foregoing process of determining the second amplitude value set from the neighboring digital echo sequence 708. Details are not described.

It can be learned that a quantity of all second amplitude value sets that are determined by the light detection and ranging and that correspond to one second pixel is equal to a quantity of all first amplitude value sets corresponding to the first pixel, and a location of any first amplitude value set in the digital echo sequence is the same as a location of one second amplitude value set in a neighboring digital echo sequence.

Step 205: The light detection and ranging performs summation on the target first amplitude value set and the target second amplitude value set.

In this embodiment, the light detection and ranging may determine at least one corresponding first amplitude value set for the first pixel. For example, if the light detection and ranging determines a plurality of corresponding first amplitude value sets for the first pixel, the light detection and ranging may determine corresponding second amplitude value sets one by one for the plurality of first amplitude value sets, and determine, one by one, whether correlation coefficients of the first amplitude value sets and the corresponding second amplitude value sets are greater than or equal to a preset threshold. This embodiment provides an example description by using the foregoing target first amplitude value set and target second amplitude value set as an example.

Optionally, when the light detection and ranging determines the target first amplitude value set and the target second amplitude value set, the light detection and ranging may perform summation on the target first amplitude value set and the target second amplitude value set. A specific summation process is as follows. Summation is performed on all amplitude values included in the target first amplitude value set and all amplitude values included in the target second amplitude value set. When the target first amplitude value set includes a pulse signal, there is a relatively strong correlation between the pulse signal included in the target first amplitude value set and a pulse signal included in the second amplitude value set, and there is a relatively poor correlation between noise included in the target first amplitude value set and noise included in the target second amplitude value set, so that a signal-to-noise ratio of the first echo signal is effectively improved when summation is performed on the target first amplitude value set and the target second amplitude value set.

For example, the target first amplitude value set is $w_{x,y,i}(n)$ and the target second amplitude value set is $w_{x,y-1,i}'(n)$, summation may be performed on the target first amplitude value set and the target second amplitude value set by using the following formula, to obtain an accumulated amplitude value set $E(n)$:

$$E(n)=w_{x,y,i}(n)+w_{x,y-1,i}'(n)$$

Optionally, to further improve ranging accuracy, before performing summation on the target first amplitude value set and the target second amplitude value set, the light detection and ranging first determines whether the target first amplitude value set and the target second amplitude value set meet a summation condition. The light detection and ranging performs summation on the target first amplitude value set and the target second amplitude value set only when the light detection and ranging determines that the target first amplitude value set and the target second amplitude value set meet the summation condition.

In this embodiment, for example, the summation condition is that a correlation coefficient of the target first amplitude value set and the target second amplitude value set is greater than or equal to a preset threshold. It can be learned that the light detection and ranging performs summation on the target first amplitude value set and the target second amplitude value set only when the light detection and ranging determines that the correlation coefficient of the target first amplitude value set and the target second amplitude value set is greater than or equal to the preset threshold.

The following first provides an example description of the correlation coefficient.

A value of the correlation coefficient in this embodiment is in a positive correlation with a similarity degree of the target first amplitude value set and the target second amplitude value set that correspond to each other. A specific determining process of determining the correlation coefficient of the target first amplitude value set and the target second amplitude value set is not limited in this embodiment, provided that the determined correlation coefficient can represent the similarity degree of the target first amplitude value set and the target second amplitude value set, so that if the correlation coefficient is larger, an amplitude value corresponding to each first sampling point included in the target first amplitude value set is closer to an amplitude value corresponding to each second sampling point included in the target amplitude value set.

Optionally, the preset threshold in this embodiment may be a preset fixed value, or may be determined by the light detection and ranging based on a specific parameter. For example, the preset threshold determined by the light detection and ranging is in a positive correlation with at least one of a signal-to-noise ratio of the first amplitude value set, the signal-to-noise ratio of the first echo signal, or a sampling moment of a peak sampling point included in the first amplitude value set, where the peak sampling point is a sampling point corresponding to a largest value of the plurality of amplitude values included in the first amplitude value set.

Further, optionally, the light detection and ranging may preset a threshold list. The threshold list includes correspondences between different signal-to-noise ratio intervals and different preset thresholds. When the light detection and ranging receives the first echo signal corresponding to the first pixel, the light detection and ranging may calculate the signal-to-noise ratio for the first echo signal, and determine, based on the threshold list, a preset threshold corresponding to the signal-to-noise ratio of the first echo signal.

The following provides an example description of a specific process in which the light detection and ranging determines the correlation coefficient of the target first amplitude value set and the target second amplitude value set.

Optionally, the light detection and ranging in this embodiment may determine the correlation coefficient of the target first amplitude value set and the target second amplitude value set in the following manner.

For example, the coordinates of the first pixel in the two-dimensional coordinate system are (x, y), the target first amplitude value set of the first pixel is $w_{x,y,i}(n)$, and the location of the target first amplitude value set in the digital echo sequence is $[n_{i,min}, n_{i,max}]$. For example, coordinates of the second pixel in the two-dimensional coordinate system are (x, y−1), and the target second amplitude value set of the second pixel is $w_{x,y-1,i}'(n)$. The light detection and ranging may calculate the correlation coefficient $r(W_{x,y-1,i}', W_{x,y,i})$ of the target first amplitude value set $w_{x,y,i}(n)$ and the target second amplitude value set $w_{x,y-1,i}'(n)$ by using the following formula:

$$r(W_{x,y-1,i}', W_{x,y,i}) = \frac{\text{Cov}(W_{x,y-1,i}', W_{x,y,i})}{\sqrt{\text{Var}(W_{x,y-1,i}')\text{Var}(W_{x,y,i})}} = $$

$$\frac{\sum_{n=1}^{N_{Truncate}} (w_{x,y,i}(n) - \overline{W_{x,y,i}})(w_{x,y-1,i}'(n) - \overline{W_{x,y-1,i}'})}{\sqrt{\sum_{n=1}^{N_{Truncate}} (w_{x,y,i}(n) - \overline{W_{x,y,i}})^2} \sqrt{\sum_{n=1}^{N_{Truncate}} (w_{x,y,i}'(n) - \overline{W_{x,y-1,i}'})^2}},$$

where $\text{Cov}(W_{x,y-1,i}', W_{x,y,i})$ is a covariance of $w_{x,y-1,i}'(n)$ and $w_{x,y,i}(n)$, $\text{Var}(W_{x,y-1,i}')$ is a variance of $w_{x,y-1,i}'(n)$, $\text{Var}(W_{x,y,i})$ is a variance of $w_{x,y,i}(n)$, and $N_{Truncate}$ is a quantity of sampling points included in the target first amplitude value set, that is, in the example, $N_{Truncate}=2*M+1$. $\overline{W_{x,y,i}}$ represents an average value of $w_{x,y,i}(n)$, and $w_{x,y-1,i}'$ represents an average value of $w_{x,y-1,i}'(n)$.

Step 206: The light detection and ranging obtains a target ranging set based on all first amplitude value sets and all second amplitude value sets.

When the light detection and ranging determines that the first pixel corresponds to a plurality of first amplitude value sets, the light detection and ranging may calculate, in the foregoing manner for each first amplitude value set, an accumulated amplitude value set corresponding to each first amplitude value set. It can be learned that, when the light detection and ranging calculates, by using the foregoing process, all accumulated amplitude value sets corresponding to the first pixel, the light detection and ranging may determine that the target ranging set is a sum of all the accumulated amplitude value sets corresponding to the first pixel.

For example, if the light detection and ranging determines that a first pixel A includes first amplitude value sets A1, A2, and A3, the light detection and ranging may determine two second pixels: a second pixel B and a second pixel C. The second pixel B corresponds to second amplitude value sets B1, B2, and B3. The second amplitude value set B1 corresponds to the first amplitude value set A1, the second amplitude value set B2 corresponds to the first amplitude value set A2, and the second amplitude value set B3 corresponds to the first amplitude value set A3. The second pixel C corresponds to second amplitude value sets C1, C2, and C3. The second amplitude value set C1 corresponds to the first amplitude value set A1, the second amplitude value set C2 corresponds to the first amplitude value set A2, and the second amplitude value set C3 corresponds to the first amplitude value set A3.

When the light detection and ranging determines that all the first amplitude value sets corresponding to the first pixel A and the corresponding second amplitude value sets all meet the foregoing summation condition, the light detection and ranging may learn, through calculation, that all accumulated amplitude value sets corresponding to the first pixel are sequences A1+B1, A1+C1, A2+B2, A2+C2, A3+B3, and A3+C3, and the light detection and ranging may determine that the target ranging set is A1+B1+A1+C1+A2+B2+A2+C2+A3+B3+A3+C3.

Step 207: The light detection and ranging performs ranging based on the target ranging set.

When the light detection and ranging determines the target ranging set corresponding to the first pixel, the light detection and ranging may perform ranging based on the target ranging set.

Optionally, an occasion in which the light detection and ranging performs ranging in this embodiment is not limited. For example, the light detection and ranging may perform ranging when determining a target ranging set for each pixel. For another example, the light detection and ranging may perform ranging after obtaining target ranging sets corresponding to all pixels in one frame. For another example, in the pixel matrix, the light detection and ranging may perform ranging after obtaining target ranging sets corresponding to all pixels in each horizontal direction. For another example, in the pixel matrix, the light detection and ranging may perform ranging after obtaining target ranging sets corresponding to all pixels in each vertical direction. For another example, in the pixel matrix, the light detection and ranging may perform ranging after obtaining target ranging sets corresponding to all pixels corresponding to one or more transmit moments. This is not limited in this embodiment.

Beneficial effects of using the method in this embodiment are as follows. Because the first pixel is located in the same associated area as the second pixel, it indicates that the location of the first pixel is adjacent to the location of the second pixel, the transmit angle corresponding to the first pixel is adjacent to the transmit angle corresponding to the second pixel, the first echo signal corresponding to the first pixel and the second echo signal corresponding to the second pixel are echo signals reflected by a same target object, and the first echo signal and the second echo signal are echo signals reflected by different locations of the same target object, so that there is a strong correlation between pulse signals corresponding to the plurality of first sampling points and the plurality of second sampling points at same locations in the first echo signal and the second echo signal, but there are weak correlations between the pulse signal and noise and between noise. Summation is performed on amplitude values corresponding to all sampling points at same locations in the first amplitude value set and each second amplitude value set, to obtain an accumulated amplitude value set, thereby effectively improving a signal-to-noise ratio of the accumulated amplitude value set. In addition, impact of a spatial correlation of the target object on ranging is fully considered in a ranging process, thereby effectively improving ranging accuracy.

Figure 8:
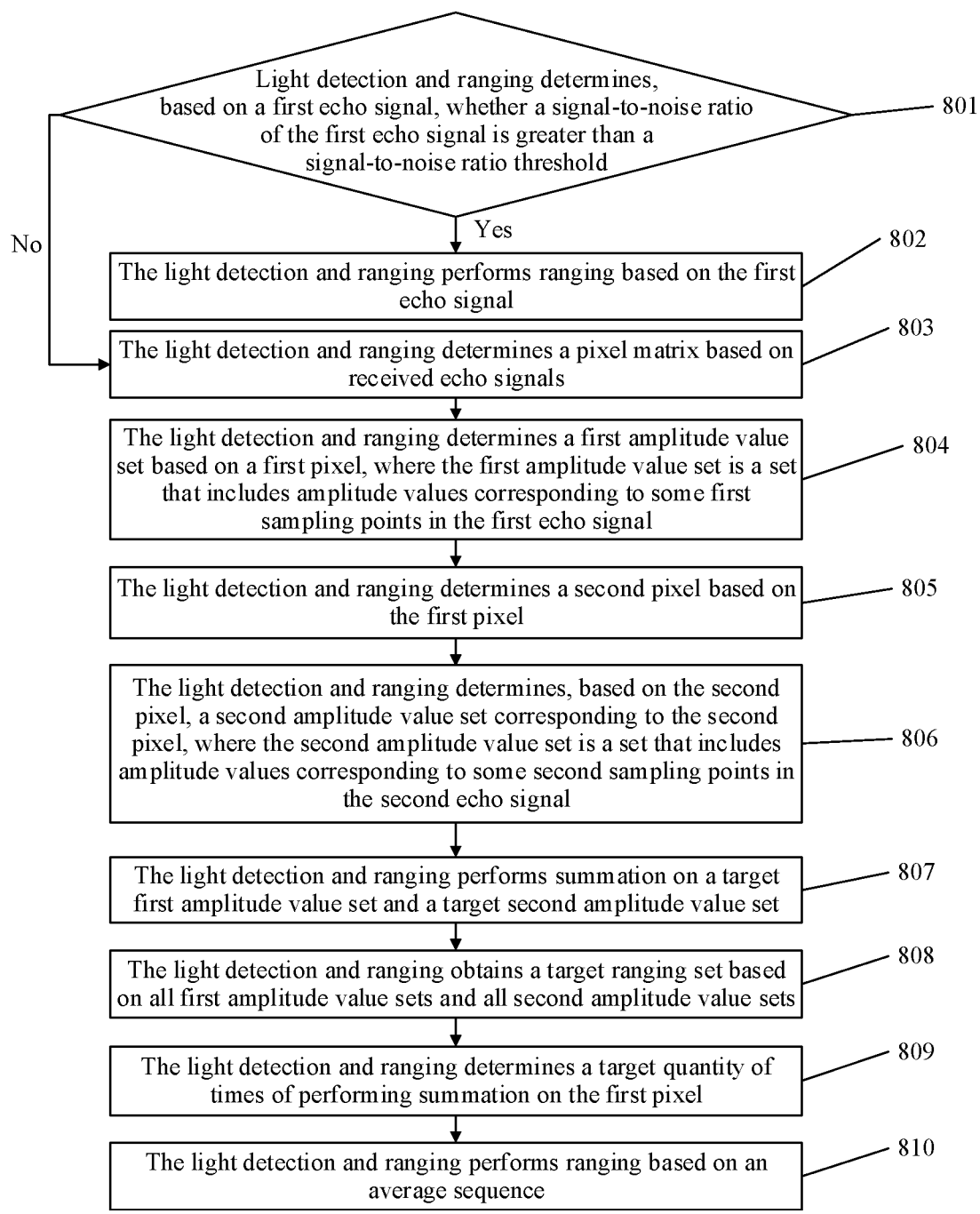
FIG. 8 is a flowchart of steps of another embodiment of a ranging method according to this application.

The following describes, based on an embodiment shown in FIG. 8, an execution process of a ranging method for further improving ranging accuracy.

Step 801: Light detection and ranging determines, based on a first echo signal, whether a signal-to-noise ratio of the first echo signal is greater than a signal-to-noise ratio threshold, and if yes, executes step 802, or if no, executes step 803.

The light detection and ranging may estimate the signal-to-noise ratio of the first echo signal, and determine whether the signal-to-noise ratio is greater than or equal to the preset signal-to-noise ratio threshold. The preset signal-to-noise ratio threshold is determined based on a system test status or an empirical value, and the signal-to-noise ratio may be a peak signal-to-noise ratio or may be a net value signal-to-noise ratio. The peak signal-to-noise ratio is a signal-to-noise ratio corresponding to a sampling point with a largest amplitude value in the first echo signal, and the net value signal-to-noise ratio is an average value of signal-to-noise ratios corresponding to all sampling points included in the first echo signal.

The light detection and ranging in this application may transmit a detection signal to a target object. After the light detection and ranging receives an echo signal reflected by the target object based on the detection signal, the light detection and ranging may perform noise reduction filtering on the first echo signal. The first echo signal in this embodiment is one of at least one echo signal received by the light detection and ranging by using a detector.

To improve ranging efficiency, in this embodiment, the light detection and ranging may filter the first echo signal. A specific noise reduction filtering manner is not limited in this embodiment, provided that the light detection and ranging can perform noise reduction on the first echo signal. For example, the light detection and ranging may perform noise reduction filtering on the first echo signal by using at least one filtering manner of matched filtering, Gaussian filtering, smooth filtering, or Wiener filtering.

Optionally, in this embodiment, a noise reduction filtering module included in a signal processing and control unit of the light detection and ranging may filter the first echo signal. A specific component configured to filter the echo signal is not limited in this embodiment, provided that the light detection and ranging can perform noise reduction filtering on the first echo signal.

This embodiment provides an example description by using, as an example, the step in which the light detection and ranging determines, after performing noise reduction filtering on the first echo signal, whether the signal-to-noise ratio of the first echo signal is greater than or equal to the signal-to-noise ratio threshold.

Step 802: The light detection and ranging performs ranging based on the first echo signal.

In this embodiment, if the light detection and ranging determines that the signal-to-noise ratio of the first echo signal obtained after the noise reduction filtering is greater than or equal to the signal-to-noise ratio threshold, it indicates that the light detection and ranging can accurately measure a distance from the target object based on the first echo signal. The light detection and ranging may directly measure the distance for the first echo signal. A specific manner in which the light detection and ranging performs ranging based on the first echo signal is not limited in this embodiment, provided that the light detection and ranging can accurately measure the distance between the light detection and ranging and the target object based on the first echo signal. For example, the light detection and ranging may perform ranging by using a single-echo calculation mode or a multi-echo distance calculation mode. A specific ranging manner includes but is not limited to distance detection methods such as a peak detection method, a front porch identification method, a centroid method, and Gaussian decomposition. The single-echo calculation mode means that a detection signal is irradiated onto only one target object, and there is only one pulse in an echo signal received by the light detection and ranging. The multi-echo calculation mode means that a detection signal is irradiated onto a plurality of target objects, and there are a plurality of pulses in an echo signal received by the light detection and ranging.

Step 803: The light detection and ranging determines a pixel matrix based on received echo signals.

Step 804: The light detection and ranging determines a first amplitude value set based on a first pixel, where the first amplitude value set is a set that includes amplitude values corresponding to some first sampling points in the first echo signal.

Step 805: The light detection and ranging determines a second pixel based on the first pixel.

Step 806: The light detection and ranging determines, based on the second pixel, a second amplitude value set corresponding to the second pixel, where the second amplitude value set is a set that includes amplitude values corresponding to some second sampling points in the second echo signal.

For specific execution processes of step 803 to step 806 in this embodiment, refer to step 201 to step 204 in FIG. 2. Details are not described again.

Step 807: The light detection and ranging performs summation on a target first amplitude value set and a target second amplitude value set.

In this embodiment, when the light detection and ranging determines that the target first amplitude value set and the target second amplitude value set meet a summation condition, the light detection and ranging performs summation on the target first amplitude value set and the target second amplitude value set.

The summation condition in this embodiment includes the following two conditions: a first condition and a second condition.

The first condition is that a correlation coefficient of the target first amplitude value set and the target second amplitude value set is greater than or equal to a preset threshold. For a specific description, refer to the embodiment shown in FIG. 2. Details are not described again. The second condition is that a target parameter of the first echo signal corresponding to the first pixel and a target parameter of the second echo signal corresponding to the second pixel meet a preset relationship.

That the first pixel and the second pixel meet the summation condition may mean that the first pixel and the second pixel meet at least one of the first condition and the second condition. In this embodiment, the light detection and ranging performs summation on the target first amplitude value set and the target second amplitude value set only when the first pixel and the second pixel meet both the first condition and the second condition.

The following describes the second condition.

The following first describes the target parameter of the first pixel and the target parameter of the second pixel.

In this embodiment, the target parameter of the first pixel is an amplitude value of a peak sampling point of the first echo signal corresponding to the first pixel or the signal-to-noise ratio of the first echo signal corresponding to the first pixel, and the target parameter of the second pixel is an amplitude value of a peak sampling point of the second echo signal corresponding to the second pixel or a signal-to-noise ratio of the second echo signal corresponding to the second pixel.

The peak sampling point is a sampling point corresponding to a largest amplitude value in a plurality of sampling points included in the echo signal. This embodiment provides an example description by using an example in which the target parameter is the amplitude value of the peak sampling point of the echo signal.

In an optional manner, a searching and accumulating solution may be used for the second condition. The searching and accumulating solution in this embodiment means performing summation on the target parameter of the first pixel and a target parameter of at least one second pixel to obtain a target sum, and if a ratio of the target sum to a weighting coefficient is greater than or equal to the target parameter of the first pixel, determining that the second condition is met. Details are as follows.

For example, a target parameter of a first pixel A0 is B0, there are n second pixels (A1, A2, . . . , and An), and target parameters of the n second pixels are B1, B2, . . . , and Bn respectively.

The light detection and ranging may first sort, in descending order, the target parameters respectively corresponding to the n second pixels, the sorted target parameters corresponding to then second pixels may be B1, B2, . . . , and Bn, and B1, B2, . . . , and Bn are sorted in descending order.

When the light detection and ranging determines the sorted n target parameters B1, B2, . . . , and Bn, the light detection and ranging may perform calculations one by one in an order of B1, B2, . . . , and Bn.

Optionally, the light detection and ranging determines whether $(B0+B1)/\sqrt{N1}>B0$ holds true. This embodiment provides an example description by using an example in which the weighting coefficient is $\sqrt{N}$. A specific value of the weighting coefficient is not limited in this embodiment, provided that N is any value greater than or equal to 1.

In this example, being divided by radical N is performed to enable noise of the echo signal to return to an original level that exists before the ranging method in this embodiment is executed. N is a quantity of pixels on which the light detection and ranging needs to perform summation. In this example, a value of N is 2.

If the condition holds true, the light detection and ranging determines that sequence summation can be performed on a first amplitude value set determined based on the first pixel A0 and a second amplitude value set determined based on the second pixel A1.

If the condition does not hold true, the light detection and ranging determines not to perform summation on any second pixel ranked behind A1 and the first pixel, that is, the light detection and ranging does not perform summation on the first pixel A0 and any one of the second pixels A1, A2, . . . , and An.

Then, the light detection and ranging may determine whether $(B0+B1+B2)/\sqrt{N}>B0$ holds true. In this example, because the light detection and ranging performs summation on the pixels B0, B1, and B2, summation is performed on three pixels, and a value of N is 3. If the condition holds true, the light detection and ranging determines that sequence summation can be performed on a first amplitude value set determined based on the first pixel A0 and a second amplitude value set determined based on the second pixel A2.

If the condition does not hold true, the light detection and ranging determines not to perform summation on any second pixel ranked behind A1 and the first pixel, that is, the light detection and ranging does not perform summation on the first pixel A0 and any one of second pixels A2 to An.

By analogy, determining is performed in descending order of the foregoing target parameters, until determining is performed on all the second pixels determined by the light detection and ranging, or until the light detection and ranging determines that a specific second pixel no longer meets the second condition.

In another optional manner, a searching and accumulating solution may be used for the second condition. The searching and accumulating solution means that the light detection and ranging determines whether the target parameter of the second pixel is greater than or equal to a product of the target parameter of the first pixel and a preset coefficient, and if the target parameter of the second pixel is greater than or equal to the product of the target parameter of the first pixel and the preset coefficient, determines that the second condition is met. Details are as follows.

The light detection and ranging may determine whether Bi>=M*B0 holds true, where Bi represents a target parameter corresponding to any one of second pixels A1, A2, . . . , and An corresponding to a first pixel. A value of the preset coefficient M is not limited in this embodiment, provided that M is any value in an interval from 0 to 1. This embodiment provides an example description by using M= $\sqrt{2}-1$ as an example.

If the condition holds true, the light detection and ranging determines that sequence summation can be performed on a first amplitude value set determined based on the first pixel A0 and a second amplitude value set determined based on the second pixel Bi.

If the condition does not hold true, the light detection and ranging determines that sequence summation cannot be performed on a first amplitude value set determined based on the first pixel A0 and a second amplitude value set determined based on the second pixel Bi.

Step 808: The light detection and ranging obtains a target ranging set based on all first amplitude value sets and all second amplitude value sets.

For a specific process in which the light detection and ranging executes step 808 in this embodiment, refer to the specific process in which the light detection and ranging executes step 206 in FIG. 2. Details are not described again in this embodiment.

Step 809: The light detection and ranging determines a target quantity of times of performing summation on the first pixel.

Each time the light detection and ranging performs summation on one first amplitude value set and one second amplitude value set, the light detection and ranging increases a statistical value of the target quantity of times by 1 until the light detection and ranging performs the summation in the foregoing step on all the first amplitude value sets of the first pixel and the corresponding second amplitude value sets. This is shown in the following formula:

$$N_{x,y,i}^{acc}=N_{x,y,i}^{acc}+1,$$

where $N_{x,y,i}^{acc}$ is a quantity of times of performing sequence summation on an $i^{th}$ first amplitude value set of the first pixel (x, y), and the $i^{th}$ first amplitude value set is one of at least one first amplitude value set corresponding to the first pixel.

Step 810: The light detection and ranging performs ranging based on an average sequence.

Optionally, the average sequence is a quotient of the target ranging set and the target quantity of times.

For details, refer to the following formula:

$$\overline{w_{x,y,i}(n)} = \frac{w_{x,y,i}(n)}{N_{x,y,i}^{acc}},$$

where $\overline{w_{x,y,i}(n)}$ represents the average sequence, and $w_{x,y,i}(n)$ represents the target ranging set.

Optionally, the average sequence may be a quotient of the target ranging set and a radical target quantity of times.

For details, refer to the following formula:

$$\overline{w_{x,y,i}(n)}=w_{x,y,i}(n)/\sqrt{N_{x,y,i}^{acc}N}.$$

For a description of a specific process in which the light detection and ranging performs ranging based on the average sequence in this embodiment, refer to the description of the specific process in which the light detection and ranging performs ranging based on the target ranging set in FIG. 2. Details are not described in this embodiment.

According to the method in this embodiment, the light detection and ranging may first determine whether the signal-to-noise ratio of the first echo signal obtained after the noise reduction filtering is less than or equal to the signal-to-noise ratio threshold. When the signal-to-noise ratio of the first echo signal obtained after the noise reduction filtering is greater than the signal-to-noise ratio threshold, the light detection and ranging may directly perform ranging based on the first echo signal, to obtain an accurate ranging result. When the signal-to-noise ratio of the first echo signal is less than or equal to the signal-to-noise ratio threshold, the echo signal may be processed by using the method in this embodiment, to improve the signal-to-noise ratio of the signal and improve ranging accuracy.

Figure 9:
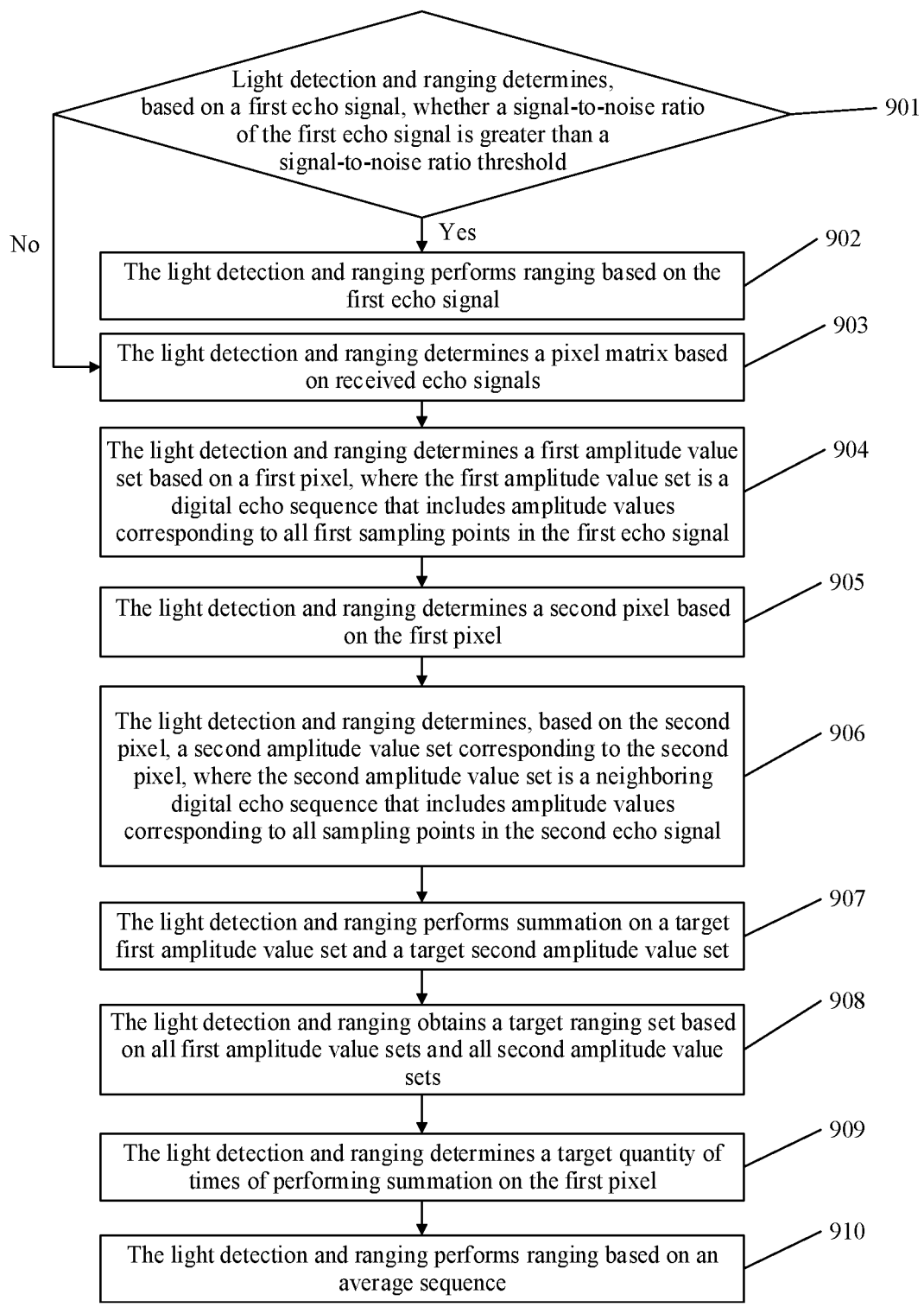
FIG. 9 is a flowchart of steps of another embodiment of a ranging method according to this application.

The foregoing embodiment uses an example in which the first pixel corresponds to a plurality of first amplitude value sets. The following describes, with reference to an embodiment shown in FIG. 9, a specific process of executing the ranging method when the first pixel corresponds to one first amplitude value set.

Step 901: Light detection and ranging determines, based on a first echo signal, whether a signal-to-noise ratio of the first echo signal is greater than a signal-to-noise ratio threshold, and if yes, executes step 902, or if no, executes step 903.

Step 902: The light detection and ranging performs ranging based on the first echo signal.

Step 903: The light detection and ranging determines a pixel matrix based on received echo signals.

For specific execution processes of step 901 to step 903 in this embodiment, refer to step 801 to step 803 in FIG. 8. The specific execution processes are not described again in this embodiment.

Step 904: The light detection and ranging determines a first amplitude value set based on a first pixel, where the first amplitude value set is a digital echo sequence that includes amplitude values corresponding to all first sampling points in the first echo signal.

The first amplitude value set corresponding to the first pixel in this embodiment is the digital echo sequence. For a specific description of the digital echo sequence, refer to the embodiment shown in FIG. 2. Details are not described again in this embodiment. That is, in this embodiment, for example, the first amplitude value set is $r_{x,y}(n)$.

Step 905: The light detection and ranging determines a second pixel based on the first pixel.

Step 906: The light detection and ranging determines, based on the second pixel, a second amplitude value set corresponding to the second pixel, where the second amplitude value set is a neighboring digital echo sequence that includes amplitude values corresponding to all sampling points in the second echo signal.

When coordinates of the first pixel are (x, y), for example, coordinates of the determined second pixel are (x+1, y). The second amplitude value set corresponding to the second pixel in this embodiment is the neighboring digital echo sequence $r_{x+1,y}(n)$. For a specific description of the neighboring digital echo sequence, refer to the embodiment shown in FIG. 2. Details are not described again.

Step 907: The light detection and ranging performs summation on a target first amplitude value set and a target second amplitude value set.

The light detection and ranging in this embodiment may determine whether a correlation coefficient of the first amplitude value set and the second amplitude value set is greater than or equal to a preset threshold. When the light detection and ranging determines that the correlation coefficient of the first amplitude value set and the second amplitude value set is greater than or equal to the preset threshold, the light detection and ranging performs summation on the first amplitude value set and the second amplitude value set. For a specific description of the preset threshold, refer to the specific description of the first condition in FIG. 9. Details are not described again in this embodiment.

Optionally, the light detection and ranging in this embodiment may calculate the correlation coefficient r ($r_{x,y}$(n), $r_{x+1,y}$(n)) of the first amplitude value set and the second amplitude value set by using the following formula:

$$r(r_{x,y}(n), r_{x+1,y}(n)) = \frac{Cov(r_{x,y}(n), r_{x+1,y}(n))}{\sqrt{Var(r_{x,y}(n))Var(r_{x+1,y}(n))}} = \frac{\sum_{n=1}^{N_{r_{x,y}(n)}} (r_{x,y}(n) - \overline{r_{x,y}(n)})(r_{x+1,y}(n) - \overline{r_{x+1,y}(n)})}{\sqrt{\sum_{n=1}^{N_{r_{x,y}(n)}} (r_{x,y}(n) - \overline{r_{x,y}(n)})^2} \sqrt{\sum_{n=1}^{N_{r_{x,y}(n)}} (r_{x+1,y}(n) - \overline{r_{x+1,y}(n)})^2}},$$

where Cov($r_{x,y}$ (n), $r_{x+1,y}$ (n)) is a covariance of the first amplitude value set $r_{x,y}$(n) and the second amplitude value set $r_{x+1,y}$(n), Var($r_{x,y}$(n)) is a variance of the first amplitude value set $r_{x,y}$(n), Var($r_{x+1,y}$(n)) is a variance of the second amplitude value set $r_{x+1,y}$(n), $N_{r_{x,y}(n)}$ is a length of the first amplitude value set $r_{x,y}$(n), $N_{r_{x+1,y}(n)}$ is a quantity of sampling points included in the second amplitude value set $r_{x+1,y}$(n), and $N_{r_{x,y}(n)}$ is equal to $N_{r_{x+1,y}(n)}$ in this application scenario.

Optionally, in this embodiment, before summation is performed on the first amplitude value set and the second amplitude value set, it further needs to be determined whether the first pixel and the second pixel meet a second condition. For a specific description of the second condition, refer to the embodiment shown in FIG. 8. Details are not described again.

Step 908: The light detection and ranging obtains a target ranging set based on all first amplitude value sets and all second amplitude value sets.

Step 909: The light detection and ranging determines a target quantity of times of performing summation on the first pixel.

Step 910: The light detection and ranging performs ranging based on an average sequence.

For specific execution processes of step 908 to step 910 in this embodiment, refer to step 808 to step 810 in FIG. 8. Details are not described again in this embodiment.

Beneficial effects of using the method in this embodiment are as follows. Because the first pixel is located in a same associated area as the second pixel, it indicates that a location of the first pixel is adjacent to a location of the second pixel, a transmit angle corresponding to the first pixel is adjacent to a transmit angle corresponding to the second pixel, the first echo signal corresponding to the first pixel and the second echo signal corresponding to the second pixel are echo signals reflected by a same target object, and the first echo signal and the second echo signal are echo signals reflected by different locations of the same target object, so that there is a strong correlation between pulse signals corresponding to all the first sampling points and all the second sampling points in the first echo signal and the second echo signal, but there are weak correlations between the pulse signal and noise and between noise. Therefore, the light detection and ranging performs summation only on the first amplitude value set corresponding to the first pixel and the second amplitude value set corresponding to the second pixel, so that in a summation process, the signal-to-noise ratio of the first echo signal corresponding to the first pixel is improved and the ranging accuracy is improved.

Figure 10:
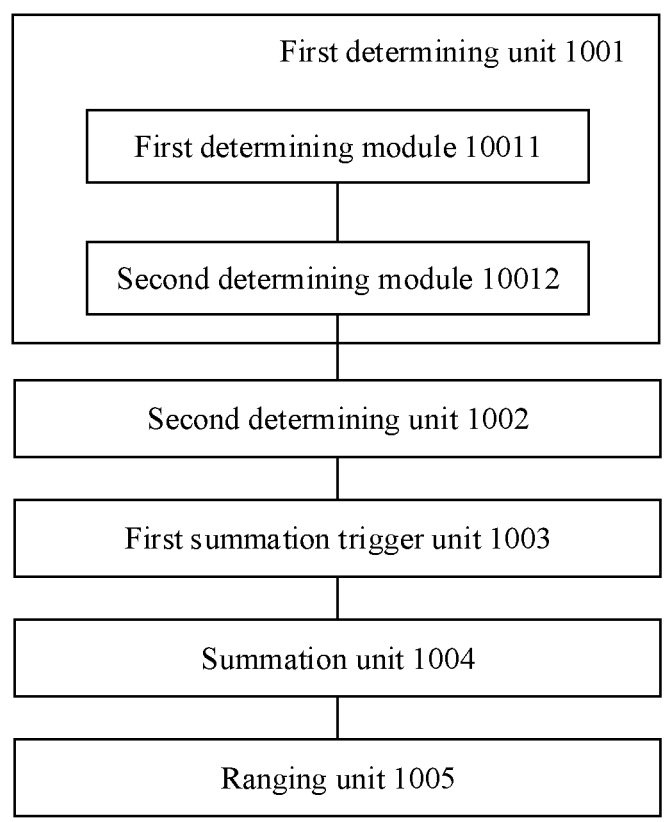
FIG. 10 is a schematic structural diagram of an embodiment of radar according to this application.

The following provides, with reference to FIG. 10, an example description of a structure of radar provided in this application. Radar shown in FIG. 10 is configured to execute the ranging method shown in FIG. 2. For descriptions of a specific execution process and beneficial effects, refer to FIG. 2. Details are not described again in this embodiment.

As shown in FIG. 10, the radar includes a first determining unit 1001, a second determining unit 1002, a first summation trigger unit 1003, a summation unit 1004, and a ranging unit 1005.

The first determining unit 1001 is configured to determine a first amplitude value set based on a first echo signal corresponding to a first pixel, where the first amplitude value set includes amplitude values corresponding to a plurality of first sampling points of the first echo signal.

Further, the first determining unit 1001 includes a first determining module 10011 configured to determine, based on the first echo signal, a digital echo sequence corresponding to the first pixel, where the digital echo sequence includes amplitude values corresponding to all sampling points of the first echo signal, and a second determining module 10012 configured to determine that the first amplitude value set is the digital echo sequence.

The second determining unit 1002 is configured to determine a plurality of second amplitude value sets based on the first amplitude value set and a plurality of second pixels in an associated area of the first pixel, where at least one of the plurality of second pixels is adjacent to the first pixel, the plurality of second pixels are in a one-to-one correspondence with a plurality of second echo signals, the plurality of second amplitude value sets includes amplitude values corresponding to a plurality of second sampling points of one of the plurality of second echo signals, and locations of the plurality of second sampling points in the second echo signal are the same as locations of the plurality of first sampling points in the first echo signal.

The associated area is a partial area included in a pixel matrix, the pixel matrix includes a plurality of pixels distributed in M rows and N columns, different pixels in the plurality of pixels correspond to different echo signals, M and N are positive integers greater than or equal to 1, and the first pixel is a pixel included in the pixel matrix.

The first summation trigger unit 1003 is configured to determine a correlation coefficient of the first amplitude value set and each second amplitude value set, where a value of the correlation coefficient is in a positive correlation with a similarity degree of the first amplitude value set and each second amplitude value set, and the first summation trigger unit is further configured to determine that the correlation coefficient is greater than or equal to a preset threshold.

The preset threshold is in a positive correlation with at least one of a signal-to-noise ratio of the first amplitude value set, a signal-to-noise ratio of the first echo signal, or a sampling moment of a peak sampling point included in the first amplitude value set, where the peak sampling point is a sampling point corresponding to a largest value of the plurality of amplitude values included in the first amplitude value set.

The first summation trigger unit 1003 is further configured to determine the correlation coefficient based on a covariance of the first amplitude value set and the second amplitude value set, a variance of the first amplitude value set, and a variance of the second amplitude value set.

The summation unit 1004 is configured to perform summation on amplitude values corresponding to all sampling points at same locations in the first amplitude value set and each second amplitude value set, to obtain an accumulated amplitude value set.

The ranging unit 1005 is configured to perform ranging on the target object based on the accumulated amplitude value set.

Figure 11:
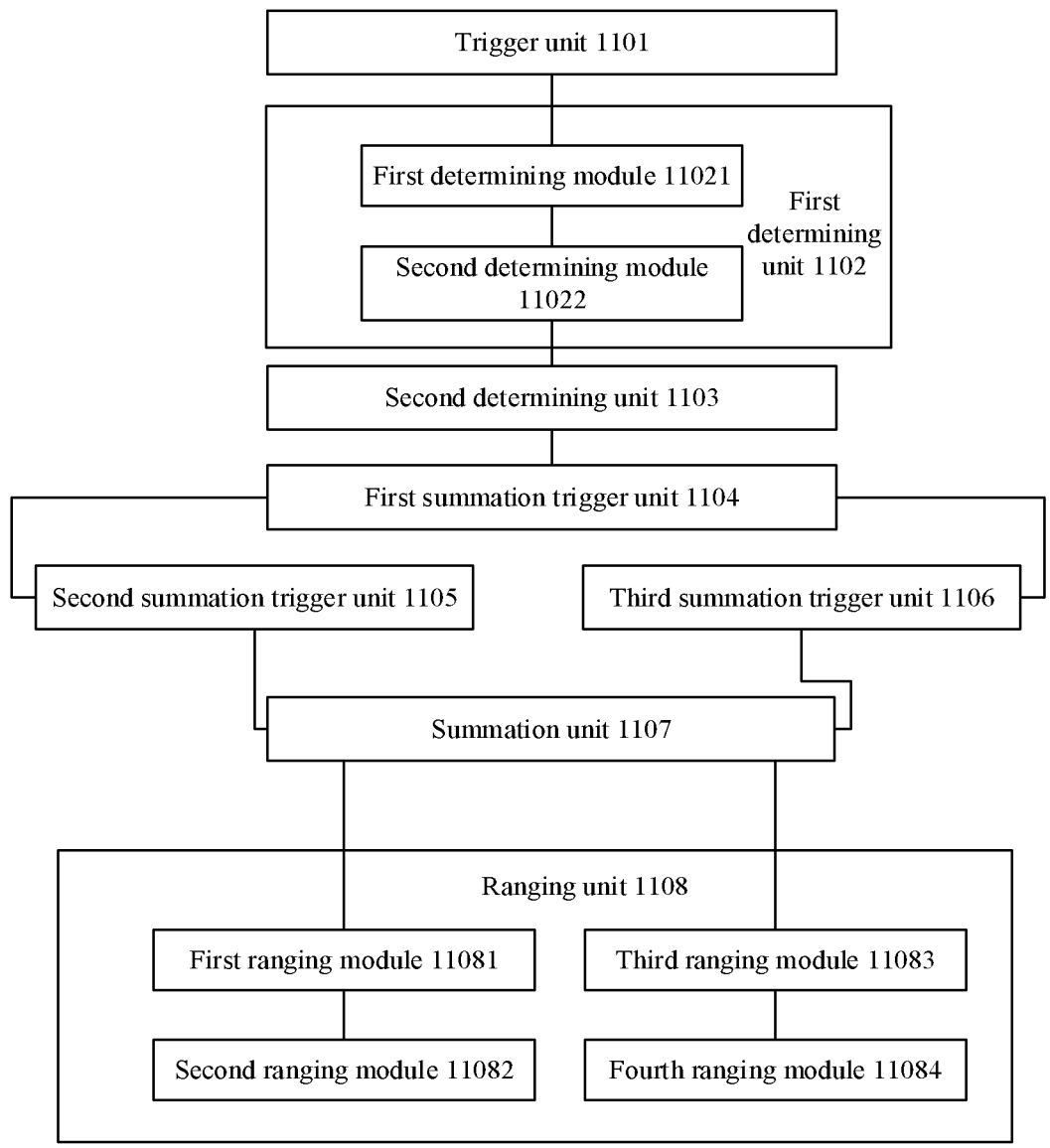
FIG. 11 is a schematic structural diagram of another embodiment of radar according to this application.

The following provides, with reference to FIG. 11, an example description of another structure of radar provided in this application. Radar shown in FIG. 11 is configured to execute the ranging method shown in FIG. 8 or FIG. 9. For descriptions of a specific execution process and beneficial effects, refer to FIG. 8 or FIG. 9. Details are not described again in this embodiment.

A trigger unit 1101 is configured to determine that a signal-to-noise ratio of the first echo signal is less than or equal to a signal-to-noise ratio threshold.

When the trigger unit 1101 determines that the signal-to-noise ratio of the first echo signal is less than or equal to the signal-to-noise ratio threshold, a first determining unit 1102 may be triggered to execute a corresponding step.

The first determining unit 1102 is configured to determine a first amplitude value set based on the first echo signal corresponding to a first pixel, where the first amplitude value set includes amplitude values corresponding to a plurality of first sampling points of the first echo signal.

Further, the first determining unit 1102 includes a first determining module 11021 configured to determine, based on the first echo signal, a digital echo sequence corresponding to the first pixel, where the digital echo sequence includes amplitude values corresponding to all sampling points of the first echo signal, and a second determining module 11022 configured to determine at least one first amplitude value set from the digital echo sequence, where the first amplitude value set includes at least one amplitude value of a target list, the target list includes an amplitude value corresponding to each of N inflection points in the digital echo sequence, N is a positive integer greater than or equal to 1, and the amplitude value corresponding to each inflection point is greater than an amplitude value corresponding to a sampling point adjacent to the inflection point.

The second determining module 11022 is further configured to determine that an amplitude value at a middle location in the plurality of amplitude values included in the first amplitude value set is one of N amplitude values included in the target list, where all the amplitude values included in the first amplitude value set are sequentially arranged in time order based on corresponding sampling moments, and a sampling moment corresponding to the amplitude value at the middle location is a middle moment in all the sampling moments corresponding to the first amplitude value set.

A second determining unit 1103 is configured to determine a plurality of second amplitude value sets based on the first amplitude value set and a plurality of second pixels in an associated area of the first pixel, where at least one of the plurality of second pixels is adjacent to the first pixel, the plurality of second pixels are in a one-to-one correspondence with a plurality of second echo signals, the plurality of second amplitude value sets includes amplitude values corresponding to a plurality of second sampling points of one of the plurality of second echo signals, and locations of the plurality of second sampling points in the second echo signal are the same as locations of the plurality of first sampling points in the first echo signal.

The associated area is a partial area included in a pixel matrix, the pixel matrix includes a plurality of pixels distributed in M rows and N columns, different pixels in the plurality of pixels correspond to different echo signals, M and N are positive integers greater than or equal to 1, and the first pixel is a pixel included in the pixel matrix.

A first summation trigger unit 1104 is configured to determine a correlation coefficient of the first amplitude value set and each second amplitude value set, where a value of the correlation coefficient is in a positive correlation with a similarity degree of the first amplitude value set and each second amplitude value set, and the first summation trigger unit is further configured to determine that the correlation coefficient is greater than or equal to a preset threshold.

The preset threshold is in a positive correlation with at least one of a signal-to-noise ratio of the first amplitude value set, the signal-to-noise ratio of the first echo signal, or a sampling moment of a peak sampling point included in the first amplitude value set, where the peak sampling point is a sampling point corresponding to a largest value of the plurality of amplitude values included in the first amplitude value set.

The first summation trigger unit 1104 is further configured to determine the correlation coefficient based on a covariance of the first amplitude value set and the second amplitude value set, a variance of the first amplitude value set, and a variance of the second amplitude value set.

A second summation trigger unit 1105 is configured to perform summation on a target parameter of the first pixel and a target parameter of the at least one second pixel to obtain a target sum, where the target parameter of the first pixel is an amplitude value of a peak sampling point of the first echo signal corresponding to the first pixel or the signal-to-noise ratio of the first echo signal corresponding to the first pixel, and the target parameter of the second pixel is an amplitude value of a peak sampling point of a second echo signal corresponding to the second pixel or a signal-to-noise ratio of a second echo signal corresponding to the second pixel, and the second summation trigger unit is further configured to determine that a ratio of the target sum to a weighting coefficient is greater than or equal to the target parameter of the first pixel.

A third summation trigger unit 1106 is configured to determine that the target parameter of the second pixel is greater than or equal to a product of the target parameter of the first pixel and a preset coefficient, where the target parameter of the first pixel is the amplitude value of the peak sampling point of the first echo signal corresponding to the first pixel or the signal-to-noise ratio of the first echo signal corresponding to the first pixel, and the target parameter of the second pixel is the amplitude value of the peak sampling point of the second echo signal corresponding to the second pixel or the signal-to-noise ratio of the second echo signal corresponding to the second pixel.

Optionally, the radar in this embodiment may determine, by sequentially performing determining by using the first summation trigger unit 1104 and the second summation trigger unit 1105, whether to execute a summation unit 1107.

Optionally, the radar in this embodiment may determine, by sequentially performing determining by using the first summation trigger unit 1104 and the third summation trigger unit 1106, whether to execute a summation unit 1107.

The summation unit 1107 is configured to perform summation on amplitude values corresponding to all sampling points at same locations in the first amplitude value set and each second amplitude value set, to obtain an accumulated amplitude value set.

A ranging unit 1108 is configured to perform ranging on the target object based on the accumulated amplitude value set.

Optionally, the ranging unit 1108 includes a first ranging module 11081 configured to obtain a target ranging set, where the target ranging set is a sum of all accumulated amplitude value sets corresponding to a plurality of first amplitude value sets, and a second ranging module 11082 configured to perform ranging based on the target ranging set.

Further, optionally, the ranging unit 1108 includes a third ranging module 11083 configured to obtain a target ranging set, where the target ranging set is a sum of all accumulated amplitude value sets corresponding to a plurality of first amplitude value sets, and a fourth ranging module 11084 configured to perform ranging based on an average sequence, where the average sequence is a sequence obtained by averaging the target ranging set.

This application further provides vehicle-mounted radar. For a specific description of a hardware structure of the vehicle-mounted radar provided in this application, refer to FIG. 1A and FIG. 1B. Details are not described herein again.

A laser 103 included in the vehicle-mounted radar in this application is configured to transmit a plurality of detection signals to a target object, the detector 108 is configured to receive optical signals generated by the target object by reflecting the plurality of detection signals, and the signal processing and control unit 101 is configured to perform processing based on the optical signals, to generate a first echo signal and a plurality of second echo signals. For a specific description, refer to the foregoing description. Details are not described again.

The signal processing and control unit 101 included in the vehicle-mounted radar is configured to execute the ranging method in this application. For a specific execution process of the ranging method, refer to FIG. 2, FIG. 8, or FIG. 9. Details are not described again.

The following describes, from a perspective of physical hardware, a specific structure of the radar provided in this application.

Figure 12:
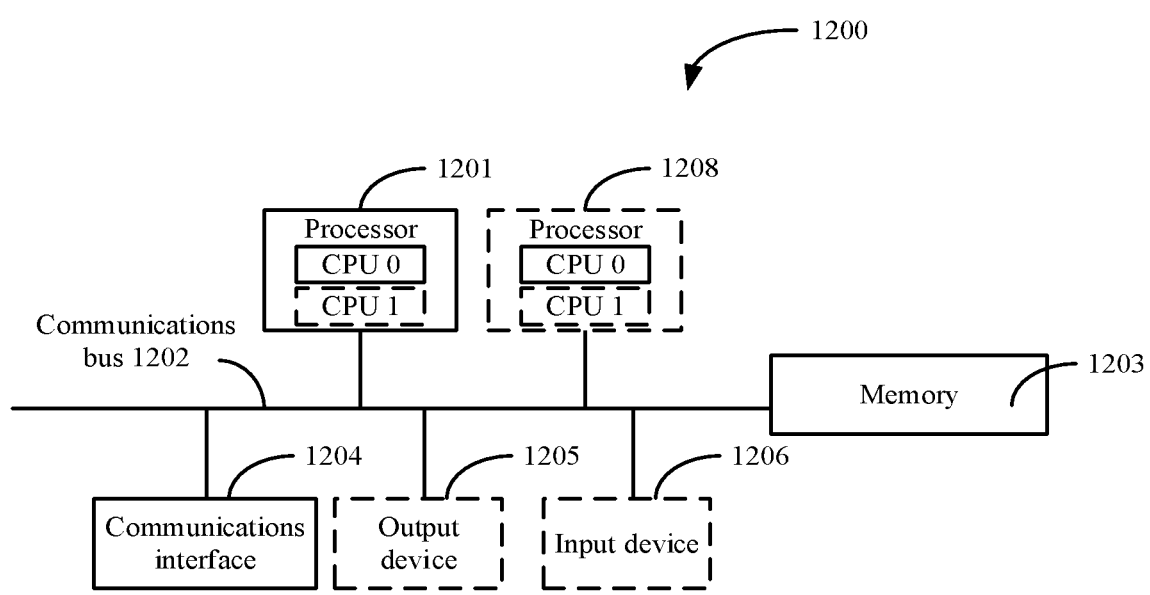
FIG. 12 is a schematic structural diagram of another embodiment of radar according to this application.

As shown in FIG. 12, to execute the ranging method in this application, radar 1200 in this embodiment includes at least one processor 1201, a communications bus 1202, a memory 1203, and at least one communications interface 1204.

The processor 1201 may be a general-purpose CPU, a microprocessor, an ASIC, or one or more integrated circuits configured to control program execution of the solutions in the present disclosure.

The communications bus 1202 may include a path for transmitting information between the foregoing components.

The communications interface 1204 is configured to use any apparatus such as a transceiver to communicate with another device or a communications network such as the Ethernet, a radio access network (RAN), or a wireless local area network (wireless local area networks, WLAN).

The memory 1203 may be a read-only memory (ROM) or another type of static storage device that can store static information and an instruction, or a random-access memory (RAM) or another type of dynamic storage device that can store information and an instruction, or may be an electrically erasable programmable ROM (EEPROM), a compact disc (CD) ROM (CD-ROM) or another CD storage, an optical disc storage (including a compressed optical disc, a laser disc, an optical disc, a digital versatile disc (DVD), a BLU-RAY optical disc, and the like), a magnetic disk storage medium or another magnetic storage device, or any other medium that can carry or store expected program code in a form of an instruction or a data structure and that can be accessed by a computer. However, the memory 1203 is not limited thereto. The memory may exist independently and is connected to the processor by using the bus. Alternatively, the memory may be integrated into the processor.

The memory 1203 is configured to store application program code for executing the solutions in the present disclosure. As shown in the figure, the memory 1203 stores logic code corresponding to three functional modules of a client 102, and the processor 1201 controls execution of the code. The processor 1201 is configured to execute the application program code stored in the memory 1203, to implement the ranging method in the foregoing embodiment.

During specific implementation, in an embodiment, the processor 1201 may include one or more CPUs, for example, a CPU 0 and a CPU 1 in FIG. 12.

During specific implementation, in an embodiment, the radar 1200 may include a plurality of processors, for example, the processor 1201 and a processor 1208 in FIG. 12. Each of these processors may be a single-core (single-CPU) processor, or may be a multi-core (multi-CPU) processor. The processor herein may be one or more devices, circuits, and/or processing cores for processing data (such as a computer program instruction).

During specific implementation, in an embodiment, the radar 1200 may further include an output device 1205 and an input device 1206. The output device 1205 communicates with the processor 1201, and may display information in a plurality of manners.

It may be clearly understood by a person skilled in the art that, for the purpose of convenient and brief description, for specific working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one place, or may be distributed on a plurality of network units. Some or all of the units may be selected based on actual requirements to achieve the objectives of the solutions of the embodiments.

In addition, the functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the other approaches, or all or some of the technical solutions may be implemented in a form of a software product. The computer software product is stored in a storage medium and includes several instructions for instructing a computer device (which may be a personal computer, a server, a network device, or the like) to execute all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

What is claimed is:

1. A ranging method comprises:
    determining a first amplitude value set based on a first echo signal corresponding to a first pixel, wherein the first amplitude value set comprises first amplitude values corresponding to a plurality of first sampling points of the first echo signal, wherein determining the first amplitude value set based on the first echo signal corresponding to the first pixel comprises:
        determining, based on the first echo signal, a digital echo sequence corresponding to the first pixel, wherein the digital echo sequence comprises third amplitude values corresponding to all third sampling points of the first echo signal; and
        determining the first amplitude value set from the digital echo sequence, wherein the first amplitude value set comprises fifth amplitude values of a target list, wherein the fifth amplitude values correspond to each inflection point of N inflection points in the digital echo sequence, wherein N is a positive integer greater than or equal to 1, and wherein the fifth amplitude values are greater than a sixth amplitude value corresponding to a fifth sampling point adjacent to the each inflection point;
    determining a plurality of second amplitude value sets based on the first amplitude value set and a plurality of second pixels in an associated area of the first pixel, wherein at least one of the second pixels is adjacent to the first pixel, wherein the second pixels are in a one-to-one correspondence with a plurality of second echo signals, wherein the second amplitude value sets comprise second amplitude values corresponding to a plurality of second sampling points of one of the second echo signals, and wherein second moments of the second sampling points in the second echo signals are the same as first moments of the first sampling points in the first echo signal; and
    performing a first summation on the first amplitude values and the second amplitude values to obtain an accumulated amplitude value set for ranging on a target object.

2. The ranging method of claim 1, further comprising determining that a seventh amplitude value at a location in the middle of the first amplitude values is one of N amplitude values comprised in the target list, wherein the first amplitude values are arranged in a time order based on corresponding sampling moments, and wherein a sampling moment corresponding to the seventh amplitude value is in the middle of the corresponding sampling moments.

3. The ranging method of claim 1, wherein before performing the first summation, the ranging method further comprises:
    determining a correlation coefficient value of the first amplitude value set and each of the second amplitude value sets, wherein the correlation coefficient value is in a first positive correlation with a similarity degree of the first amplitude value set and each of the second amplitude value sets; and
    determining that the correlation coefficient value is greater than or equal to a preset threshold.

4. The ranging method of claim 3, wherein the preset threshold is in a second positive correlation with at least one of the following:
    a first signal-to-noise ratio of the first amplitude value set;
    a second signal-to-noise ratio of the first echo signal; or
    a sampling moment of a peak sampling point comprised in the first amplitude value set, wherein the peak sampling point corresponds to a maximum of the first amplitude values.

5. The ranging method of claim 3, further comprising determining the correlation coefficient value based on a covariance of the first amplitude value set and each of the second amplitude value sets, a first variance of the first amplitude value set, and a second variance of each of the second amplitude value sets.

6. The ranging method of claim 1, wherein before performing the first summation, the ranging method further comprises:
    performing a second summation on a first target parameter of the first pixel and second target parameters of the second pixels to obtain a target sum, wherein the first target parameter is a third amplitude value of a first peak sampling point of the first echo signal or a first signal-to-noise ratio of the first echo signal, and wherein each of the second target parameters is a fifth amplitude value of a second peak sampling point of a second echo signal corresponding to the second pixels or a second signal-to-noise ratio of the second echo signal; and
    determining that a ratio of the target sum to a weighting coefficient is greater than or equal to the first target parameter, wherein the weighting coefficient is a square root of N, and wherein N is a number of the second target parameters and is greater than or equal to 1.

7. The ranging method of claim 1, wherein before performing the first summation, the ranging method further comprises determining that a second target parameter of a second pixel is greater than or equal to a product of a first target parameter of the first pixel and a preset coefficient, wherein the preset coefficient is a coefficient comprising a pre-defined value, wherein the first target parameter is a third amplitude value of a first peak sampling point of the first echo signal or a first signal-to-noise ratio of the first echo signal, and wherein the second target parameter is a fifth amplitude value of a second peak sampling point of a second echo signal corresponding to the second pixel or a second signal-to-noise ratio of the second echo signal.

8. The ranging method of claim 1, wherein the associated area is a partial area comprised in a pixel matrix, wherein the pixel matrix comprises a plurality of pixels distributed in M rows and N columns, wherein different pixels in the pixels correspond to different echo signals, wherein M and N are positive integers greater than or equal to 1, and wherein the first pixel is in the pixel matrix.

9. The ranging method of claim 1, further comprising:
obtaining a target ranging set, wherein the target ranging set is a sum of all accumulated amplitude value sets corresponding to a plurality of first amplitude value sets; and
performing the ranging based on the target ranging set.

10. The ranging method of claim 1, further comprising:
obtaining a target ranging set, wherein the target ranging set is a sum of all accumulated amplitude value sets corresponding to a plurality of first amplitude value sets;
averaging the target ranging set to obtain an average sequence; and
further performing the ranging based on the average sequence.

11. The ranging method of claim 1, wherein before determining the first amplitude value set, the ranging method further comprises determining that a signal-to-noise ratio of the first echo signal is less than or equal to a signal-to-noise ratio threshold.

12. An apparatus comprising:
one or more processors; and
a non-transitory storage medium coupled to the one or more processors and configured to store program instructions, wherein, when executed by the one or more processors, the program instructions cause the apparatus to:
determine a first amplitude value set based on a first echo signal corresponding to a first pixel, wherein the first amplitude value set comprises first amplitude values corresponding to a plurality of first sampling points of the first echo signal, wherein determining the first amplitude value set based on the first echo signal corresponding to the first pixel comprises:
determining, based on the first echo signal, a digital echo sequence corresponding to the first pixel, wherein the digital echo sequence comprises third amplitude values corresponding to all third sampling points of the first echo signal; and
determining the first amplitude value set from the digital echo sequence, wherein the first amplitude value set comprises fifth amplitude values of a target list, wherein the fifth amplitude values correspond to each inflection point of N inflection points in the digital echo sequence, wherein N is a positive integer greater than or equal to 1, and wherein the fifth amplitude values are greater than a sixth amplitude value corresponding to a fifth sampling point adjacent to the each inflection point;
determine a plurality of second amplitude value sets based on the first amplitude value set and a plurality of second pixels in an associated area of the first pixel, wherein at least one of the second pixels is adjacent to the first pixel, wherein the second pixels are in a one-to-one correspondence with a plurality of second echo signals, wherein the second amplitude value sets comprise second amplitude values corresponding to a plurality of second sampling points of one of the second echo signals, and wherein second moments of the second sampling points in the second echo signals are the same as first moments of the first sampling points in the first echo signal; and
perform a first summation on the first amplitude values and the second amplitude values to obtain an accumulated amplitude value set for ranging on a target object.

13. The apparatus of claim 12, wherein, when executed by the one or more processors, the program instructions further cause the apparatus to determine that a seventh amplitude value at a location in the middle of the first amplitude values is one of N amplitude values comprised in the target list, wherein the first amplitude values are sequentially arranged in a time order based on corresponding sampling moments, and wherein a sampling moment corresponding to the seventh amplitude value is in the middle of the corresponding sampling moments.

14. The apparatus of claim 12, wherein, when executed by the one or more processors, the program instructions further cause the apparatus to:
determine a correlation coefficient value of the first amplitude value set and each of the second amplitude value sets, wherein the correlation coefficient value is in a first positive correlation with a similarity degree of the first amplitude value set and each of the second amplitude value sets; and
determine that the correlation coefficient value is greater than or equal to a preset threshold.

15. The apparatus of claim 14, wherein the preset threshold is in a second positive correlation with at least one of the following:
a first signal-to-noise ratio of the first amplitude value set;
a second signal-to-noise ratio of the first echo signal; or
a sampling moment of a peak sampling point comprised in the first amplitude value set, wherein the peak sampling point corresponds to a maximum of the first amplitude values.

16. The apparatus of claim 14, wherein, when executed by the one or more processors, the program instructions further cause the apparatus to determine the correlation coefficient value based on a covariance of the first amplitude value set and each of the second amplitude value sets, a first variance of the first amplitude value set, and a second variance of each of the second amplitude value sets.

17. The apparatus of claim 12, wherein, when executed by the one or more processors, the program instructions further cause the apparatus to:
perform a second summation on a first target parameter of the first pixel and second target parameters of the second pixels to obtain a target sum, wherein the first target parameter is a third amplitude value of a first peak sampling point of the first echo signal or a first signal-to-noise ratio of the first echo signal, and wherein each of the second target parameters is a fifth amplitude value of a second peak sampling point of a second echo signal corresponding to the second pixels or a second signal-to-noise ratio of the second echo signal; and
determine that a ratio of the target sum to a weighting coefficient is greater than or equal to the first target parameter, wherein the weighting coefficient is square root divided by a number N of the second target parameters, and wherein N is greater than or equal to 1.

18. A vehicle-mounted radar comprising:
a laser configured to transmit a plurality of detection signals to reflect off of a target object to create optical signals;
a detector configured to receive the optical signals; and
a signal processing and control processor coupled to the laser and the detector and configured to:

perform processing based on the optical signals to generate a first echo signal corresponding to a first pixel and a plurality of second echo signals;

determine, based on the first echo signal, a first amplitude value set comprising first amplitude values corresponding to a plurality of first sampling points of the first echo signal, wherein determining the first amplitude value set based on the first echo signal corresponding to the first pixel comprises:

determining, based on the first echo signal, a digital echo sequence corresponding to the first pixel, wherein the digital echo sequence comprises third amplitude values corresponding to all third sampling points of the first echo signal; and determining the first amplitude value set from the digital echo sequence, wherein the first amplitude value set comprises fifth amplitude values of a target list, wherein the fifth amplitude values correspond to each inflection point of N inflection points in the digital echo sequence, wherein N is a positive integer greater than or equal to 1, and wherein the fifth amplitude values are greater than a sixth amplitude value corresponding to a fifth sampling point adjacent to the each inflection point;

determine a plurality of second amplitude value sets based on the first amplitude value set and a plurality of second pixels in an associated area of the first pixel, wherein at least one of the second pixels is adjacent to the first pixel, wherein the second pixels are in a one-to-one correspondence with the second echo signals, wherein the second amplitude value sets comprise second amplitude values corresponding to a plurality of second sampling points of one of the second echo signals, and wherein second moments of the second sampling points in the second echo signals are the same as first moments of the first sampling points in the first echo signal; and perform a first summation on the first amplitude values and the second amplitude values to obtain an accumulated amplitude value set for ranging on the target object.

19. The vehicle-mounted radar of claim 18, wherein the signal processing and control processor is further configured to determine that a seventh amplitude value at a location in the middle of the first amplitude values is one of N amplitude values comprised in the target list, wherein the first amplitude values are arranged in a time order based on corresponding sampling moments, and wherein a sampling moment corresponding to the seventh amplitude value is in the middle of the corresponding sampling moments.

20. The vehicle-mounted radar of claim 18, wherein before performing the first summation, the signal processing and control processor is further configured to:

determine a correlation coefficient value of the first amplitude value set and each of the second amplitude value sets, wherein the correlation coefficient value is in a first positive correlation with a similarity degree of the first amplitude value set and each of the second amplitude value sets; and determine that the correlation coefficient value is greater than or equal to a preset threshold.

* * * * *